(12) United States Patent
Shikii et al.

(10) Patent No.: US 9,448,118 B2
(45) Date of Patent: Sep. 20, 2016

(54) SENSOR ASSEMBLY

(71) Applicant: Panasonic Intellectual Property Corporation of America, Torrance, CA (US)

(72) Inventors: Shinichi Shikii, Nara (JP); Koichi Kusukame, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/431,114

(22) PCT Filed: Jul. 8, 2014

(86) PCT No.: PCT/JP2014/003611
§ 371 (c)(1),
(2) Date: Mar. 25, 2015

(87) PCT Pub. No.: WO2015/015718
PCT Pub. Date: Feb. 5, 2015

(65) Prior Publication Data
US 2015/0276490 A1 Oct. 1, 2015

(30) Foreign Application Priority Data
Jul. 31, 2013 (JP) .................................. 2013-159787

(51) Int. Cl.
*G01J 5/08* (2006.01)
*G01J 1/04* (2006.01)
(Continued)

(52) U.S. Cl.
CPC ................. *G01J 5/0806* (2013.01); *G01J 1/04* (2013.01); *G01J 5/08* (2013.01); *G01J 5/10* (2013.01);
(Continued)

(58) Field of Classification Search
CPC ............ G01J 5/0806; G01J 5/10; G01J 5/08
See application file for complete search history.

(56) References Cited

U.S. PATENT DOCUMENTS 5,479,292 A 12/1995 Yoshikawa et al.
5,572,033 A * 11/1996 Grant .................. G08B 13/193
250/349

(Continued)

FOREIGN PATENT DOCUMENTS

CA 2090115 6/1999
JP 60-79128 6/1985
(Continued)

OTHER PUBLICATIONS

International Search Report (ISR) issued Oct. 21, 2014 in International (PCT) Application No. PCT/JP2014/003611.

*Primary Examiner* — Christine Sung
(74) *Attorney, Agent, or Firm* — Wenderoth, Lind & Ponack, L.L.P.

(57) ABSTRACT

A sensor assembly includes: a sensor including pixels that are aligned in a predetermined direction, the pixels being for detecting an electromagnetic wave; and a lens that forms, in a detector plane on the sensor, an image according to the electromagnetic wave, wherein the lens has an f-number in a first direction and an f-number in a second direction, the f-number in the first direction being different from the f-number in the second direction, the first direction being orthogonal to the predetermined direction in a plane parallel to the detector plane, and the second direction being the predetermined direction. For example, the f-number of the lens in the first direction is smaller than the f-number of the lens in the second direction.

14 Claims, 19 Drawing Sheets

(51) Int. Cl.
  *G02B 7/02* (2006.01)
  *G02B 13/00* (2006.01)
  *G02B 17/00* (2006.01)
  *H04N 5/33* (2006.01)
  *G02B 3/06* (2006.01)
  *G02B 3/08* (2006.01)
  *G01J 5/10* (2006.01)

(52) U.S. Cl.
  CPC . *G02B 3/06* (2013.01); *G02B 3/08* (2013.01); *G02B 7/02* (2013.01); *G02B 13/00* (2013.01); *G02B 17/00* (2013.01); *H04N 5/33* (2013.01); *G01J 2005/106* (2013.01)

(56) References Cited

U.S. PATENT DOCUMENTS

| | | |
|---|---|---|
| 6,876,450 B2 | 4/2005 | Nanami et al. |
| 8,809,789 B2 | 8/2014 | Matsumoto et al. |
| 2003/0076500 A1 | 4/2003 | Nanami et al. |
| 2012/0018639 A1 | 1/2012 | Matsumoto et al. |

FOREIGN PATENT DOCUMENTS

| | | |
|---|---|---|
| JP | 60-147671 | 8/1985 |
| JP | 2-115725 | 4/1990 |
| JP | 4-372828 | 12/1992 |
| JP | 6-94991 | 4/1994 |
| JP | 7-296269 | 11/1995 |
| JP | 9-101204 | 4/1997 |
| JP | 9-105668 | 4/1997 |
| JP | 9-145477 | 6/1997 |
| JP | 2002-228578 | 8/2002 |
| JP | 2010-133692 | 6/2010 |
| JP | 2012-26917 | 2/2012 |
| JP | 2012-198191 | 10/2012 |

* cited by examiner

SENSOR ASSEMBLY

TECHNICAL FIELD

The present invention relates to sensor assemblies used when a distribution of far infrared radiation is mainly measured.

BACKGROUND ART

A sensor assembly having a two-dimensional array sensor and an imaging optics is used to obtain an infrared two-dimensional image. In recent years, costs of sensor assemblies have been reduced so that the sensor assemblies can be included in consumer electronics devices such as air conditioners.

Patent Literature (PTL) 1 discloses a technique for obtaining a two-dimensional image by causing a line sensor to perform scanning, with a goal of reducing costs of sensor assemblies.

Patent Literature (PTL) 2 discloses an imaging optics including a lens made of silicon or germanium.

CITATION LIST

Patent Literature

[PTL 1] Japanese Unexamined Patent Application Publication No. 2010-133692
[PTL 2] Japanese Unexamined Patent Application Publication No. H6-94991

SUMMARY OF INVENTION

Unfortunately, a material such as silicon and germanium is expensive, and it is difficult to produce the material inexpensively because the material can be basically processed by only polishing.

In view of this, the present invention provides a sensor assembly that can be produced inexpensively while maintaining detection sensitivity.

A sensor assembly according to one aspect of the present invention includes: a line sensor including a plurality of pixels that are aligned in a predetermined direction, the plurality of pixels being for detecting an electromagnetic wave; and an imaging optics that forms, in a detector plane on the plurality of pixels, an image according to the electromagnetic wave, wherein the imaging optics has an f-number in a first direction and an f-number in a second direction, the f-number in the first direction being different from the f-number in the second direction, the first direction being orthogonal to the predetermined direction in a plane parallel to the detector plane, and the second direction being the predetermined direction.

A sensor assembly according to one aspect of the present invention can be produced inexpensively while maintaining detection sensitivity.

Figure 1A:
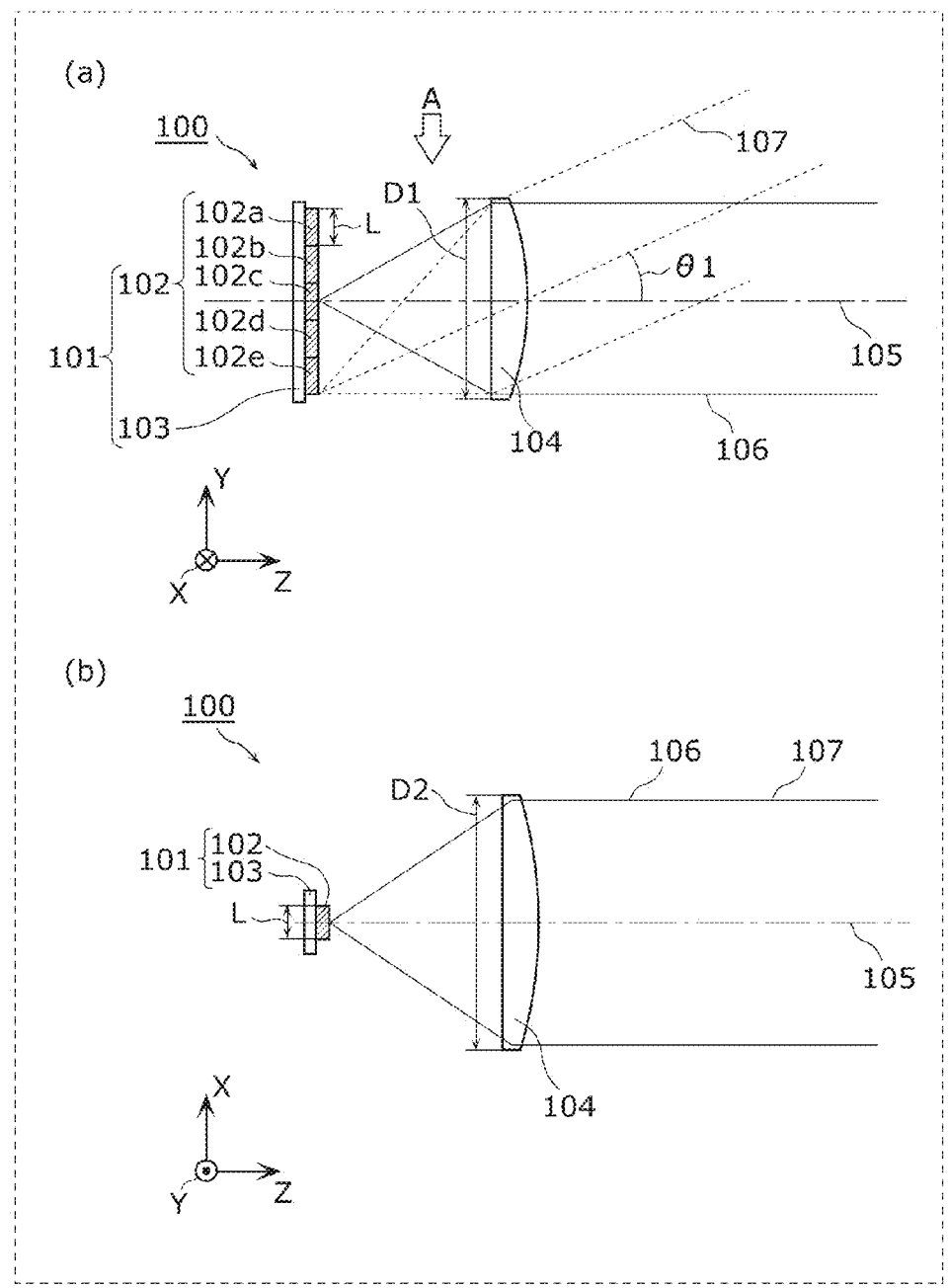
FIG. 1A includes a side view (a) and a top view (b) of a sensor assembly according to Embodiment 1.

DETAILED DESCRIPTION OF INVENTION (Underlying Knowledge Forming Basis of the Present Invention)

In relation to the sensor assembly disclosed in the Background Art section, the inventors have found the following problems.

Recent years have seen the development of various applications using infrared radiation. Infrared radiation in a near-infrared region having a wavelength of 0.2 to 2.5 micrometers is used for crime prevention such as an infrared camera or for remote control used for TVs, for instance. Moreover, infrared radiation in a mid-infrared region having a wavelength of 2.5 to 4.0 micrometers is often used in spectrometry of a transmission spectrum to be measured, to identify matter based on an absorbing spectrum unique to the measurement target.

Furthermore, because a black-body radiation spectrum nearly at normal temperature has a peak in a far-infrared region having a wavelength of 4.0 to 10 micrometers, infrared radiation in the far-infrared region emitted from matter is used to measure a surface temperature of the matter in a non-contact manner by detecting the infrared radiation. This use can be generally found in two-dimensionally measuring a surface temperature of matter as in a thermography. Like a camera with a visible region or the like, a sensor assembly included in the thermography or the like includes a two-dimensional array sensor and an imaging optics that forms an image on the two-dimensional array sensor.

A far-infrared two-dimensional array sensor conventionally includes a bolometer, for example. The bolometer detects, as a resistance value, a rise in temperature of a sensor caused by heating the sensor with incident far infrared radiation. The bolometer has high picture quality, but its mechanism for reading such as a circuit for passing current is complex and expensive.

Recently it has been necessary to reduce costs of sensor assemblies so that the sensor assemblies can be included in consumer electronics devices such as air conditioners. In view of this, the costs have been reduced by using inexpensive sensors such as thermopiles or obtaining a two-dimensional image by causing a line sensor to perform scanning (PTL 1).

Moreover, for instance, a lens made of silicon or germanium is used for an imaging optics, a structural element of a sensor assembly (PTL 2).

Unfortunately, a material such as silicon and germanium is expensive, and it is difficult to produce the material inexpensively because the material can be basically processed by only polishing. In addition, such a material has a high refractive index, but has low transmittance. Thus, there is a worry that the sensitivity of a sensor is reduced.

In view of these, the present invention provides a sensor assembly that can be produced inexpensively while maintaining detection sensitivity.

In order to solve those problems, a sensor assembly according to one aspect of the present invention includes: a line sensor including a plurality of pixels that are aligned in a predetermined direction, the plurality of pixels being for detecting an electromagnetic wave; and an imaging optics that forms, in a detector plane on the plurality of pixels, an image according to the electromagnetic wave, wherein the imaging optics has an f-number in a first direction and an f-number in a second direction, the f-number in the first direction being different from the f-number in the second direction, the first direction being orthogonal to the predetermined direction in a plane parallel to the detector plane, and the second direction being the predetermined direction.

With this, the sensor assembly is capable of increasing an amount of an electromagnetic wave that passes through the imaging optics and is detected by the pixels more than in a case where the imaging optics that has, as a common f-number in the first direction and the second direction, a larger one of the f-numbers of the imaging optics in the first direction and the second direction is used. Therefore, the sensor assembly is capable of increasing the detection sensitivity more than in the above case.

Moreover, even when a material used for the imaging optics has relatively low transmittance for electromagnetic wave, the sensor assembly is capable of maintaining or increasing an amount of an electromagnetic wave transmitted by the imaging optics as a whole. When the material used for the imaging optics has the relatively low transmittance for electromagnetic wave, an amount of an electromagnetic wave that passes through the imaging optics decreases. In contrast, by setting the different f-numbers in the first direction and the second direction as stated above, the amount of the electromagnetic wave that passes through the imaging optics is increased. Thus, by setting the increased amount to be larger than or equal to the decreased amount, it is possible to maintain or increase the amount of the electromagnetic wave transmitted by the imaging optics as a whole.

Consequently, it is unnecessary to use, for the imaging optics, a material that is high-priced and expensive to process such as silicone and germanium, and a material that is low-priced and inexpensive to process can be used for the imaging optics. Therefore, the sensor assembly can be produced inexpensively while maintaining the detection sensitivity.

For example, the f-number in the first direction is smaller than the f-number in the second direction.

With this, the sensor assembly is capable of increasing, while keeping an interval between the pixels of the line sensor the same as before, the amount of the electromagnetic wave that passes through the imaging optics. Therefore, the sensor assembly can be produced inexpensively while maintaining the detection sensitivity using the line sensor having the same configuration as before.

For example, the imaging optics includes a lens, and the lens has an f-number in the first direction that is smaller than an f-number of the lens in the second direction.

With this, the sensor assembly is specifically achieved by using the lens having the different f-factors in the first and the second directions as the imaging optics.

For example, the lens has a width in the first direction that is larger than a width of the lens in the second direction.

With this, the sensor assembly is specifically achieved by using the lens having the different widths in the first and the second directions as the imaging optics.

For example, the lens has different cross-sectional shapes in a plane orthogonal to the first direction and in a plane orthogonal to the second direction.

With this, the sensor assembly is specifically achieved by using the lens having the different cross-sectional shapes in the first and the second directions as the imaging optics.

For example, the lens has a cross-sectional shape that includes a Fresnel shape, the cross-sectional shape being in a plane orthogonal to the second direction.

With this, the sensor assembly is capable of reducing the thickness of the lens using the Fresnel lens. Here, the Fresnel shape is used for the cross-sectional shape in the plane orthogonal to the second direction in which accuracy may be relatively low between the first and the second directions. This makes it possible to reduce the thickness of the imaging optics while limiting an influence of the line sensor on detection accuracy for electromagnetic wave.

For example, the lens has a cross-sectional shape that excludes a Fresnel shape, the cross-sectional shape being in a plane orthogonal to the first direction.

With this, the sensor assembly is capable of maintain the detection accuracy for electromagnetic wave. Generally speaking, it is possible to reduce the thickness of the imaging optics by using the Fresnel lens, whereas the detection accuracy for electromagnetic wave decreases. The imaging optics is capable of maintaining the detection accuracy by avoiding using the Fresnel shape for the cross-sectional shape in the plane orthogonal to the first direction in which accuracy needs to be relatively high between the first and the second directions.

For example, the imaging optics includes a mirror, and the mirror has an f-number in the first direction that is larger than an f-number of the mirror in the second direction.

With this, the sensor assembly is specifically achieved by using the lens having the different f-factors in the first and the second directions as the imaging optics. To put it another way, the sensor assembly can be achieved using not a transmissive imaging optics but a reflective imaging optics.

For example, the mirror is an off-axis paraboloidal mirror.

With this, the sensor assembly is capable of focusing the electromagnetic wave on the pixels of the line sensor with higher accuracy.

For example, the sensor assembly further includes a planar mirror.

With this, the sensor assembly is capable of making it harder for the line sensor to receive a stray light incident on an inside of the sensor assembly. Consequently, the sensor assembly is capable of focusing the electromagnetic wave on the pixels of the line sensor with higher accuracy.

For example, (i) an angle formed by the planar mirror and a straight line connecting one of ends of the off-axis paraboloidal mirror closer to the line sensor and one of ends of the line sensor closer to the off-axis paraboloidal mirror is different from (ii) an angle formed by the planar mirror and an electromagnetic wave incident on the planar mirror from the off-axis paraboloidal mirror.

With this, the sensor assembly is specifically configured to make it harder for the line sensor to receive the stray light incident on the inside of the sensor assembly. Consequently, the sensor assembly is capable of focusing the electromagnetic wave on the pixels of the line sensor with higher accuracy.

For example, each of the plurality of pixels has a width in the first direction that is larger than a width of each of the plurality of pixels in the second direction.

With this, an electromagnetic wave is not focused on a single point in the detector plane of the pixels in the second direction, and even when the electromagnetic wave slight extends in the second direction, the pixels are capable of detecting most of the electromagnetic wave that passes the imaging optics. Consequently, the sensor assembly is capable of detecting the electromagnetic wave with higher detection sensitivity.

For example, the electromagnetic wave includes far infrared radiation having a wavelength of 8 to 10 micrometers.

With this, the sensor assembly is capable of appropriately detecting the far infrared radiation having the wavelength of 8 to 10 micrometers.

For example, the lens is made of polyethylene.

With this, the sensor assembly is produced inexpensively by using the lens made of polyethylene as the imaging optics.

For example, each of the plurality of pixels is an infrared sensor including a thermopile or a bolometer.

With this, the sensor assembly is specifically implemented as the infrared sensor including the thermopile or the bolometer.

Hereinafter, embodiments are described with reference to the Drawings.

It is to be noted that the same reference signs are assigned to the same elements, and descriptions thereof may be omitted. The Drawings primarily and schematically illustrate structural elements to facilitate understanding thereof.

Each of the exemplary embodiments described below shows a general or specific example. The numerical values, shapes, materials, structural elements, the arrangement and connection of the structural elements, steps, the processing order of the steps, etc. shown in the following exemplary embodiments are mere examples, and therefore do not limit the scope of the appended Claims and their equivalents. Therefore, among the structural elements in the following exemplary embodiments, structural elements not recited in any one of the independent claims defining the most generic part of the inventive concept are described as arbitrary structural elements. Moreover, any combination of all the embodiments can be made.

(Embodiment 1)

In this embodiment, a sensor assembly is described which is produced inexpensively and increases detection sensitivity. It is to be noted that the sensor assembly according to this embodiment is an imaging optics used for a line sensor, and can be produced inexpensively while maintaining the detection sensitivity.

A sensor assembly 100 according to this embodiment is described with reference to FIG. 1A and FIG. 1B.

(a) of FIG. 1A is a side view of the sensor assembly 100, and (b) of FIG. 1A is a top view obtained by viewing the sensor assembly 100 from a direction indicated by an arrow A in (a) of FIG. 1A. FIG. 1B is a front view of the sensor assembly 100.

In (a) of FIG. 1A, an x-axis direction penetrates a plane of paper from front to back, a y-axis direction goes from below to top in the plane of paper, and a z-axis direction goes from left to right in the plane of paper. Likewise, in (b) of FIG. 1A, an x-axis direction goes from bottom to top in a plane of paper, a y-axis direction penetrates the plane of paper from front to back, and a z-axis direction goes from left to right in the plane of paper. In the other figures, the x-, y-, and z-axis directions are as indicated by coordinate axes.

The sensor assembly 100 includes a sensor 101 and a lens 104.

The sensor 101 is a line sensor including a sensor board 103 and a pixel row 102. The pixel row 102 is disposed on the sensor board 103 and includes pixels 102a, 102b, 102c, 102d, and 102e. Each of the pixels 102a to 102e detects an electromagnetic wave.

Subsequently, each of the pixels 102a to 102e is described assuming that the pixel detects especially far infrared radiation. Generally speaking, a peak wavelength of infrared radiation emitted from a black body at normal temperature is around 8 to 10 micrometers. This wavelength range corresponds to far infrared radiation.

It is to be noted that each of the pixels 102a to 102e is implemented as, for instance, an infrared sensor including a thermopile or a bolometer.

It is to be noted that a plane on a side opposite to the lens 104 in the sensor 101 is a plane for detecting an electromagnetic wave, and thus the plane is also called a detector plane. The detector plane can be opposite to the sensor board 103 in the sensor 101. It is to be noted that although an example is described where the sensor 101 includes the five pixels, the number of pixels is not limited to five.

The lens 104 forms, in the detector plane on the sensor 101, an image according to an electromagnetic wave. The lens 104 corresponds to the imaging optics. The lens 104 is made of polyethylene, for instance. Polyethylene transmits infrared radiation of 8 to 10 micrometers. It is to be noted that the lens 104 does not have to be made of polyethylene, but may be made of a resin material that transmits the infrared radiation having the above-described wavelength and is moldable. The lens 104 is a spherical lens, for example, and its shape is described later.

Each of the pixels 102a to 102e has a width (a length in the x-axis direction) and a height (a length in the y-axis direction) both having length L, and has a square shape in an x-y plane. The pixel 102c of the sensor 101 and the lens 104 are disposed on an optical axis 105.

The pixels 102a to 102e included in the pixel row 102 are arranged side by side in the y-axis direction. The pixels 102a to 102e are arranged in the y-axis direction, but only one pixel is disposed in the x-axis direction orthogonal to the arrangement direction. In other words, the pixel row 102 is a so-called line sensor having pixels that are aligned.

Hereinafter, the x-axis direction and the y-axis direction are sometimes expressed as a first direction and a second direction, respectively. The line sensor has the pixels that are aligned by disposing one pixel in the first direction and pixels in the second direction.

The following describes an operation mechanism of the sensor assembly 100 according to this embodiment. An operation by the sensor assembly 100 in a tangential plane (a plane including an optical axis and the principal ray of each electromagnetic wave incident at a corresponding one of angles) is described with reference to (a) of FIG. 1A.

In (a) of FIG. 1A, a normal incident light 106 is an electromagnetic wave radiated from not shown one point on an object plane and the optical axis 105. The normal incident light 106 is vertically incident on the lens 104. The normal incident light 106 is focused on the pixel 102c on the optical axis 105.

Moreover, an electromagnetic wave that is radiated from not shown one point on an object plane and off the optical axis 105 and is obliquely incident on the lens 104 is called an oblique incident light. In (a) of FIG. 1A, among oblique incident lights, an oblique incident light 107 is incident at the largest incident angle θ1. The oblique incident light 107 is focused on the pixel 102e farthest from the optical axis 105.

As stated above, any electromagnetic wave that is radiated along the y-axis from the object plane and is incident on the lens 104 at an angle less than the angle θ1 is focused on one of positions in the pixel row 102 in the tangential plane.

The following describes an operation by the sensor assembly 100 in a sagittal plane (a plane including an optical axis and being orthogonal to the tangential plane) with reference to (b) of FIG. 1A. The pixels 102a to 102e are arranged in the y-axis direction, and thus the pixel row 102 can be only seen as much as a width of one pixel in (b) of FIG. 1A.

The normal incident light 106 is also vertically incident on the lens 104 in the sagittal plane, like the tangential plane in (a) of FIG. 1A. The normal incident light 106 is focused on the center of the pixel row 102 on the optical axis 105.

Moreover, the oblique incident light 107 illustrated in (a) of FIG. 1A is projected on a substantially same optical path of the normal incident light 106 in (b) of FIG. 1A, and is focused on the center of the pixel row 102 on the optical axis 105 in the x-axis direction. At this time, a reason why the normal incident light 106 and the oblique incident light 107 differ in focus position in the y-axis direction is as explained in the description of (a) of FIG. 1A.

As described above, the normal incident light 106 is focused on the pixel 102c on the optical axis 105 in each of the tangential plane and the sagittal plane. Moreover, a focal length of the lens 104 is equal in each of the tangential plane and the sagittal plane, that is, the lens 104 is a lens symmetric about an optical axis. In such a configuration, the lens 104 is capable of forming an image on the pixel row 102 from an electromagnetic wave radiated from a linear region on an object plane.

The following describes a shape of the lens 104.

Figure 2A:
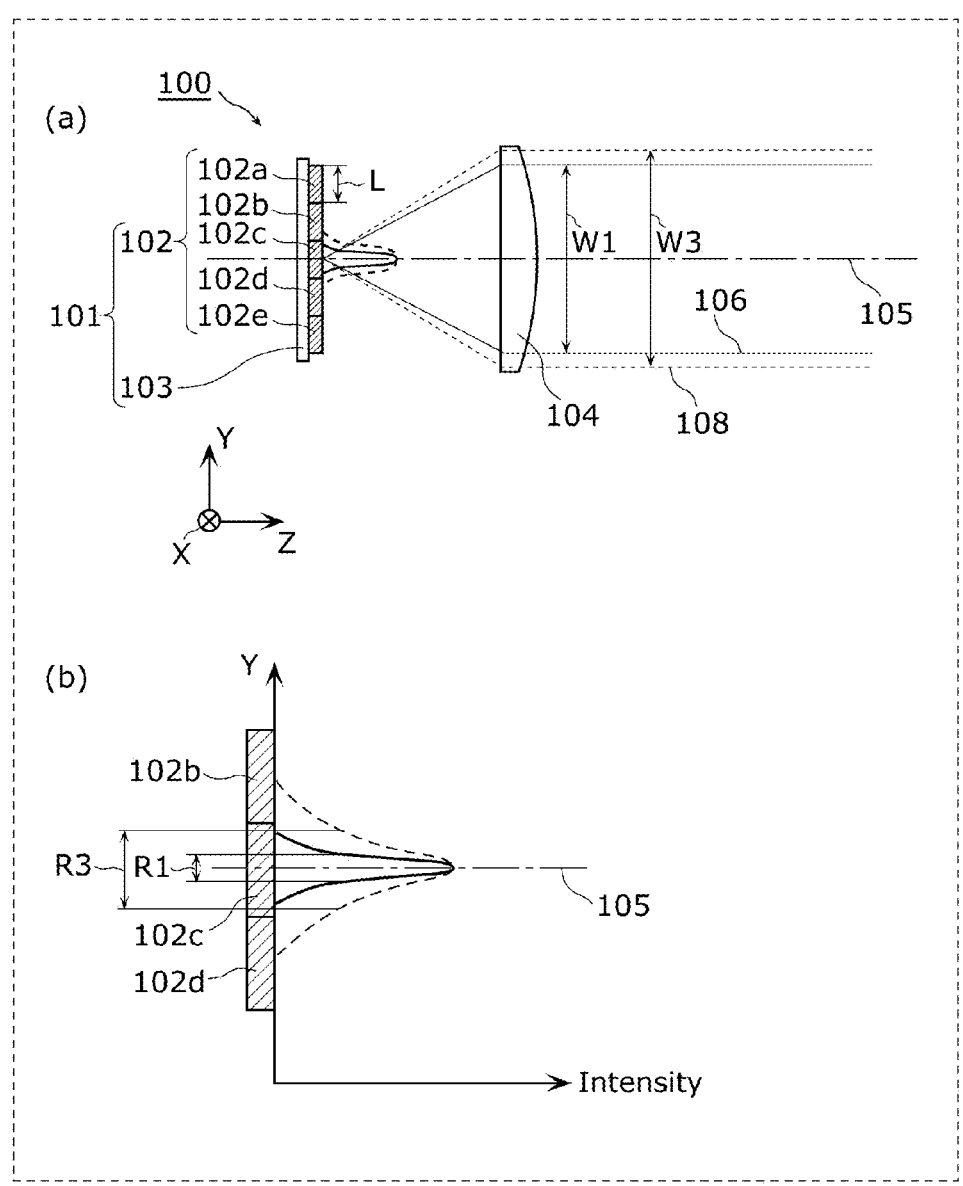
FIG. 2A includes a side view of a sensor assembly according to Embodiment 1, and a schematic diagram for a relationship between widths of incident lights incident on an imaging optics and spot diameters.

FIG. 2A includes a side view of a sensor assembly according to this embodiment, and a schematic diagram for a relationship between widths of incident lights incident on an imaging optics and spot diameters. (a) of FIG. 2A illustrates the relationship with the same scale as (a) of FIG. 1A, for instance, and (b) of FIG. 2A is an enlarged view of the relationship.

Generally speaking, the greater an amount of light of an electromagnetic wave incident on each of the pixels 102a to 102e is, the higher detection sensitivity becomes. For this reason, the lens 104 preferably has a larger diameter (width). Unfortunately, increasing the diameter of the lens leads to increase a spherical aberration.

For example, in FIG. 2A, a spot diameter in a spot position when the lens 104 focuses the normal incident light 106 having a width (a length in the y-axis direction) W1 is R1. Moreover, a spot diameter in a spot position when the lens 104 focuses a normal incident light 108 having a width W3 greater than W1 is R3. R3 is greater than R1 under some conditions due to an influence of the spherical aberration. This is generally prominent when the lens 104 is the spherical lens. Moreover, an influence of a coma aberration on oblique incident light is prominent in the tangential plane, and thus a spot diameter on a pixel for the oblique incident light further increases when an electromagnetic wave incident on the lens 104 has a large width.

It is to be noted that a large width of a beam and a large spot diameter are also expressed as a thick width of a beam or a thick spot diameter. Moreover, the term "ideally" refers to a case where the influence of the spherical aberration and the coma aberration is not considered. In contrast, the term "realistically" refers to a case where the influence of the spherical aberration and the coma aberration is considered.

When the spot diameter of the sensor 101 on the pixel increases due to these factors, for instance, like the normal incident light 106 in FIG. 2A, part of light that is ideally incident on the pixel 102c is also realistically incident on the pixel 102b or 102b adjacent to the pixel 102c. Thus, a resolution that is ideally obtainable cannot be realistically obtained. For this reason, an image obtained from the pixel row 102 is realistically blurred.

It is necessary to decrease a thickness of light incident on the lens 104 to reduce the influence of the coma aberration or the spherical aberration. Generally speaking, however, it is difficult to decrease the thickness of the light incident on the lens as well as increase the lens beyond a certain size. In other words, it is generally difficult to manage both enhancing (increasing) brightness (an amount of light) of the lens and reducing the influence of the aberration.

To solve the above-described problem, the lens 104 is designed to have a characteristic shape in the sensor assembly 100 according to this embodiment. The lens 104 has a larger lens diameter D2 in the x-axis direction (the first direction) in which the sensor includes one pixel than a lens diameter D1 in the y-axis direction (the second direction) in which the pixel row 102 is disposed. Here, the lens diameter in the x-axis direction or the like may be referred to as the width of the lens in the x-axis direction or the like.

Moreover, an f-number in the x-axis direction (the first direction) may be smaller than an f-number in the y-axis direction (the second direction).

Figure 1B:
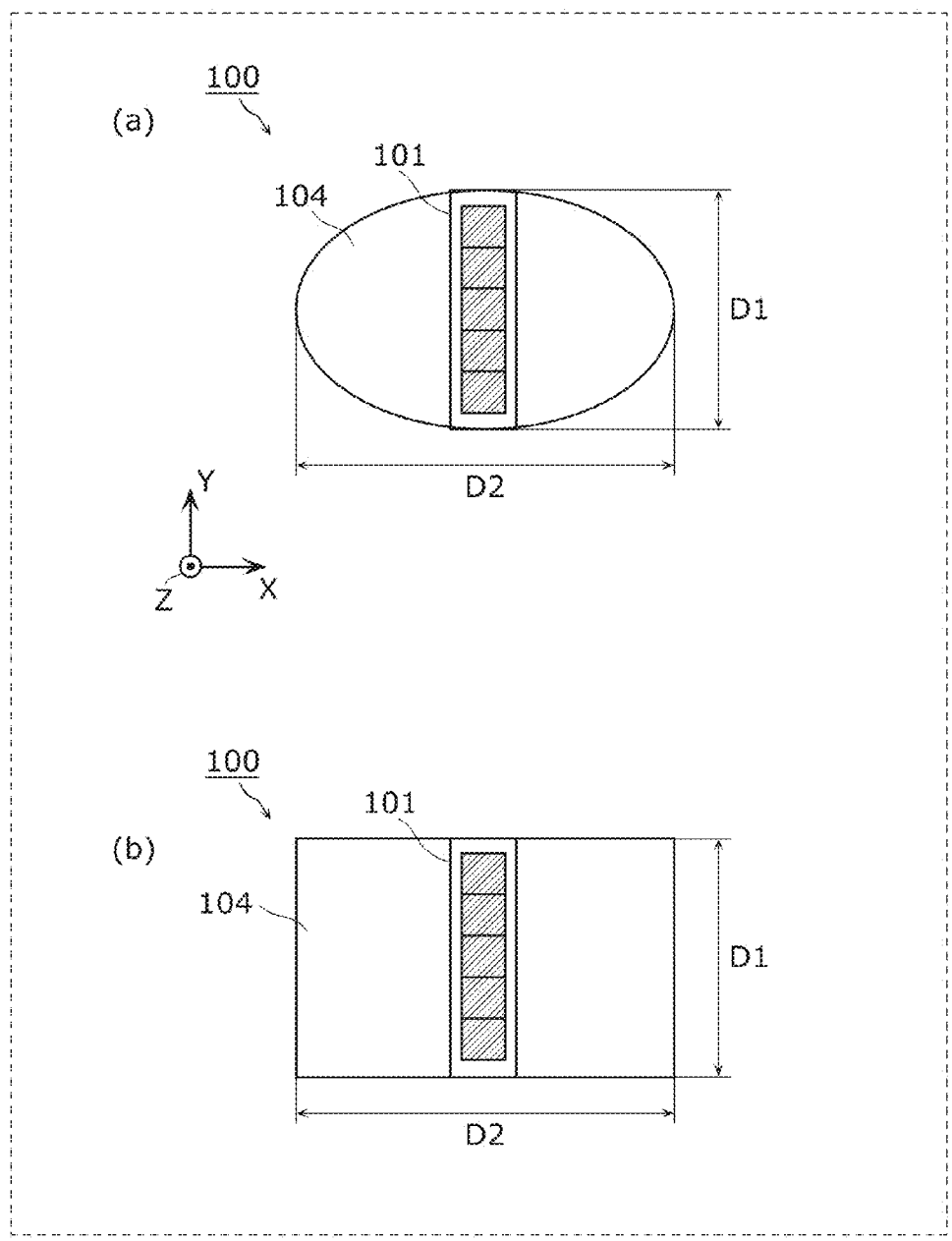
FIG. 1B is a front view of a sensor assembly according to Embodiment 1.

Each of (a) and (b) of FIG. 1B illustrates an exemplary shape of the lens 104. The shape illustrated in (a) of FIG. 1B corresponds to a shape obtained by cutting out, from a spherical lens, an ellipse having a major axis (a diameter in the x-axis direction) D2 and a minor axis (a diameter in the y-axis direction) D1. The shape illustrated in (b) of FIG. 1B corresponds to a shape obtained by cutting out, from the spherical lens, a rectangle having a long side (a side parallel to an x-axis) D2 and a short side (a side parallel to a y-axis) D1. These shapes both have a width in the x-axis direction represented by D2 and a width in the y-axis direction represented by D1. It is to be noted that the above-described shapes are mere examples, and the lens 104 is not limited to the shapes.

When the lens 104 is created by cutting out a shape from the spherical lens, the shape may be any shape having a length in the x-axis direction longer than a length in the y-axis direction. In other words, on top of the ellipse ((a) of FIG. 1B) and the rectangle ((b) of FIG. 1B), the shape may be a triangle, a pentagon, or a shape obtained by combining straight lines or curved lines.

It is to be noted that (a) and (b) of FIG. 1A are the side view and the top view of the sensor assembly 100, respectively, in the above description. These figures can be said to illustrate a cross-sectional shape of the sensor assembly 100 in a plane orthogonal to the first direction and a cross-sectional shape of the sensor assembly 100 in a plane orthogonal to the second direction, respectively. In view of this, the case could be made that a cross-sectional shape of the lens 104 in the plane orthogonal to the first direction differs from a cross-sectional shape of the lens 104 in the plane orthogonal to the second direction.

With this, the sensor assembly 100 produces the following effect.

First, in the sagittal plane illustrated in (b) of FIG. 1A, there is no pixel adjacent to each pixel in the x-axis direction, and thus even when a beam radius on the pixel increases with respect to the x-axis direction, a resolution does not deteriorate unlike the tangential plane. Moreover, an amount of light transmitting through the lens 104 increases as the lens diameter D2 in the x-axis direction increases, and thus with respect to the normal incident light 106, for example, an amount of light emitted from a cross-point of the object plane and the optical axis 105 and incident on the pixel 102c increases. As a result, the sensor assembly 100 produces the effect of increasing the detection sensitivity for light while maintaining the resolution. As described above, the sensor assembly 100 can be achieved that simultaneously satisfies the resolution and the high detection sensitivity, by setting the size of the lens in the x-axis direction orthogonal to the arrangement direction of the pixel row 102 of the sensor assembly 100 to be larger than that of the lens 104 in the y-axis direction that is the arrangement direction of the pixel row 102.

It is to be noted that the imaging optics including one lens has been described in this embodiment, but an imaging optics including lenses also produces the effect of the present invention. When the imaging optics includes the lenses, not the size of the lenses but an f-number of the imaging optics may be considered. In other words, the sensor assembly 100 can be achieved that simultaneously satisfies the resolution and the high detection sensitivity, by setting an f-number of the imaging optics in the x-axis direction orthogonal to the arrangement direction of the pixel row 102 of the sensor assembly 100 to be smaller than that of the imaging optics in the y-axis direction that is the arrangement direction of the pixel row 102.

Moreover, when the imaging optics includes the one lens as stated above, the size (an effective diameter) of the lens and the f-number satisfy (Equation 1), and thus the f-number of the imaging optics is considered in the same manner regardless of the number of lenses.

f-number=focal length/effective diameter of lens (diameter) (Equation 1)

Furthermore, the above-mentioned lens 104 may be a spherical lens or a non-spherical lens, but is not limited to either one here.

Figure 2B:
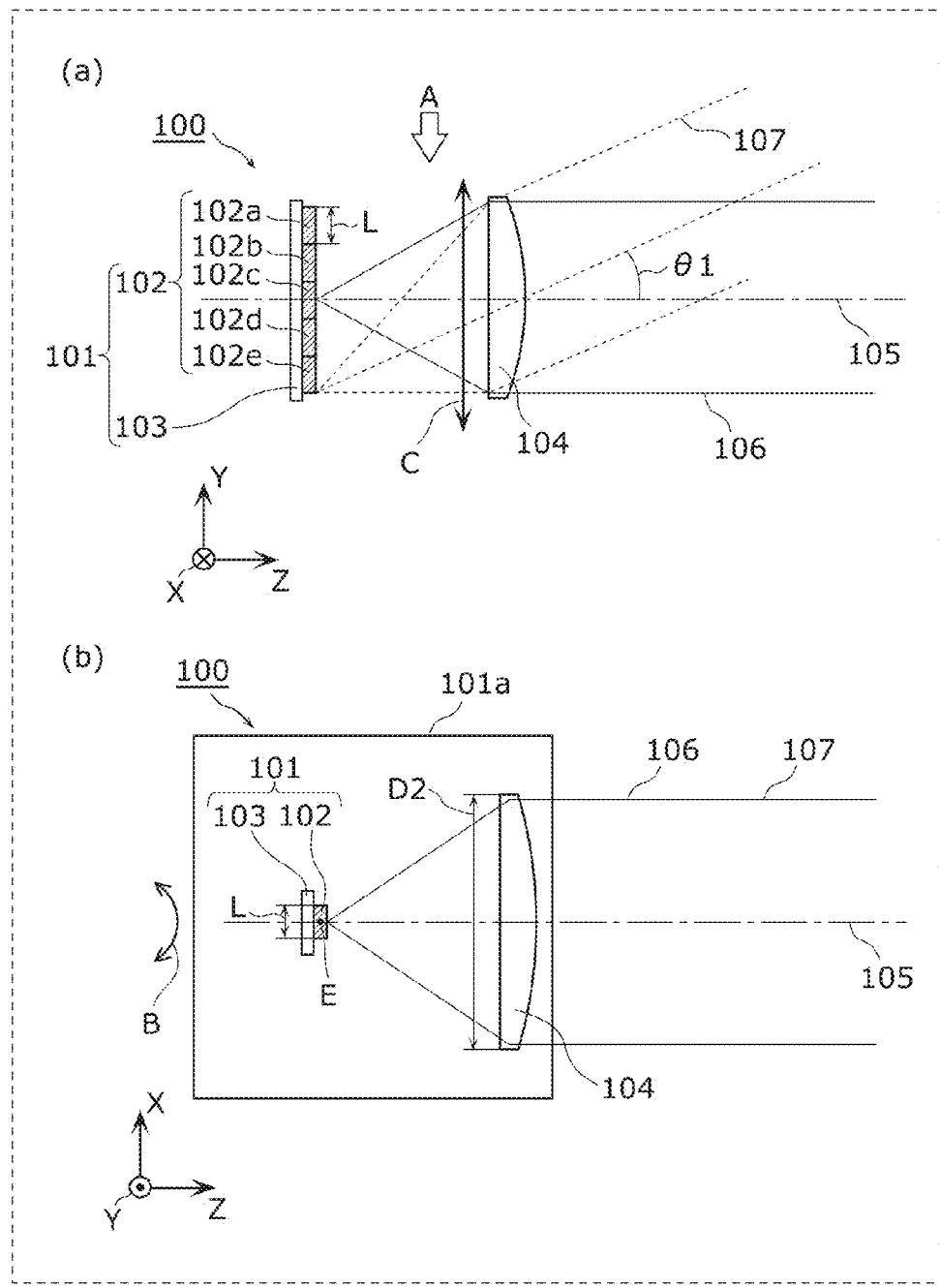
FIG. 2B is a schematic diagram for an image forming method according to Embodiment 1.

The following describes a method for forming an image using the sensor assembly 100 with reference to FIG. 2B. FIG. 2B is a schematic diagram for an image forming method according to this embodiment.

Forming an image using the sensor assembly 100 can be achieved by, for instance, obtaining an image while causing a base 101a integrally including the sensor 101 and the lens 104 to perform scanning in a direction indicated by an arrow B as illustrated in (b) of FIG. 2B. In such a case, for instance, it is possible to obtain an image having a resolution greater than a width L of the pixel row 102 by capturing an image every time the base 101a is moved by a distance half of the width L of the pixel row 102 and processing the captured images. To obtain an image having a high resolution in this manner is also referred to as super-resolution.

For the x-axis direction, the super-resolution can be achieved by rotating the base 101a each time by half of the width L of the pixel row 102 in the direction of the aforementioned arrow B. Here, a rotation center on which the base 101a is rotated can be anywhere, but may be a center E of the pixel row 102, for instance. It is possible to obtain an image accurately by rotating the sensor assembly 100 on the center E of the pixel row 102 as the rotation center.

Moreover, for the y-axis direction, the super-resolution can be achieved by obtaining an image displaced by half of the width L of the pixel row 102 in the y-axis direction by shifting the lens 104 in a direction indicated by an arrow C illustrated in (a) of FIG. 2B.

Figure 3:
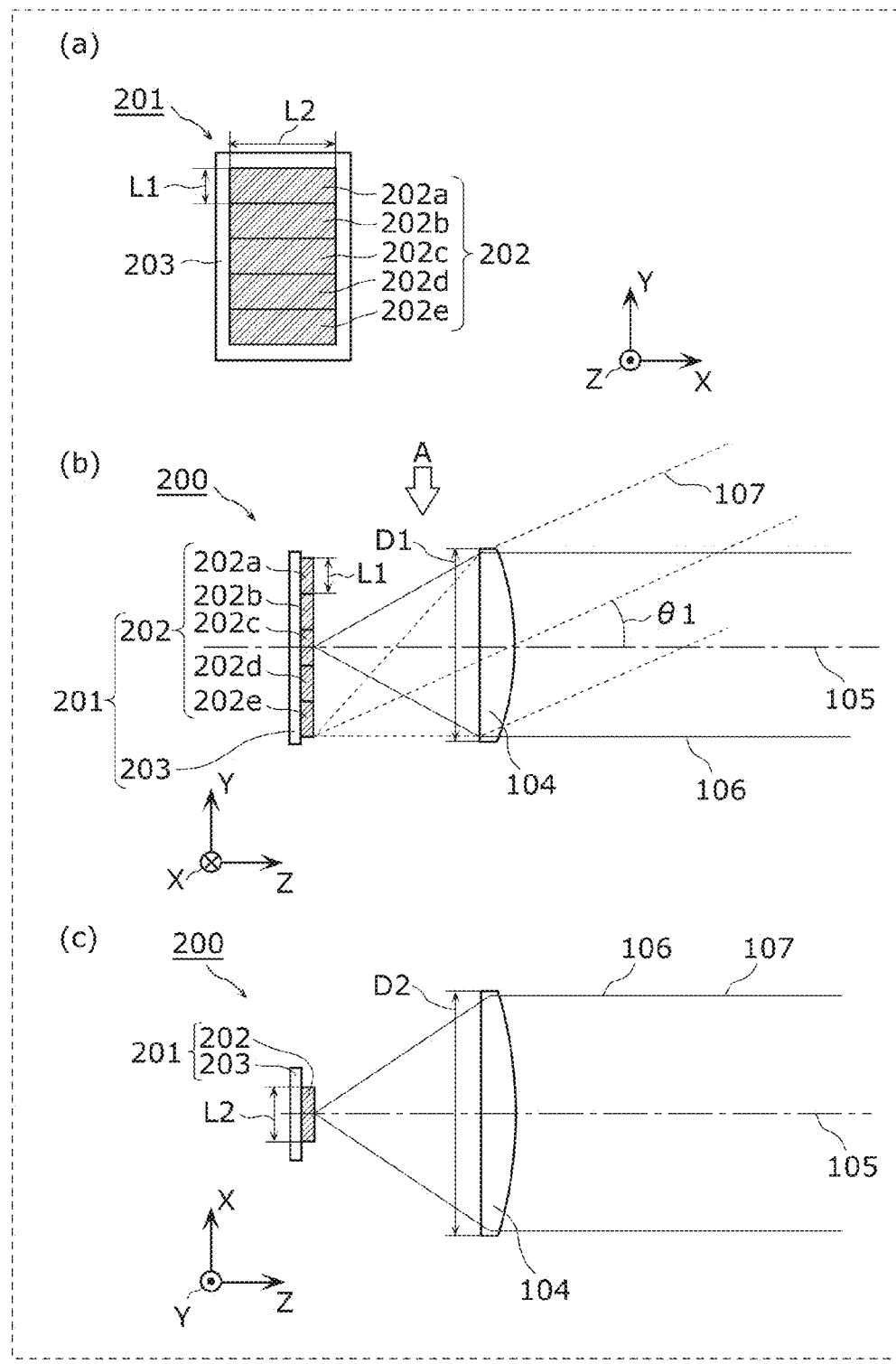
FIG. 3 includes a schematic diagram (a) of a sensor included in a sensor assembly according to Embodiment 1, and a side view (b) and a top view (c) of the sensor assembly.

FIG. 3 includes a schematic diagram (a) of a sensor included in a sensor assembly according to this embodiment, and a side view (b) and a top view (c) of the sensor assembly. A sensor assembly 200 is similar to the sensor assembly 100 illustrated in FIG. 1A, but differs from the sensor assembly 100 in including a sensor 201 instead of the sensor 101.

Like the sensor 101, the sensor 201 includes a sensor board 203 and a pixel row 202. The pixel row 202 is disposed on the sensor board 203 and includes pixels 202a, 202b, 202c, 202d, and 202e. Moreover, each of the pixels 202a to 202e is not a square, and has a length L2 in the x-axis direction orthogonal to an arrangement direction (the y-axis direction) of the pixels 202a to 202e that is greater than a length L1 in the arrangement direction. With this, in the case where the lens diameter D2 in the x-axis direction is greater than the lens diameter D1 in the y-axis direction, even when a spot diameter in the x-axis direction on the pixel row 202 increases, it is possible to receive every electromagnetic wave on the pixel row 202. As a result, the sensor assembly 200 further enhances detection sensitivity.

To put it another way, the detection sensitivity is enhanced by setting the width of each pixel in the first direction to be greater than the width of the pixel in the second direction.

Figure 4:
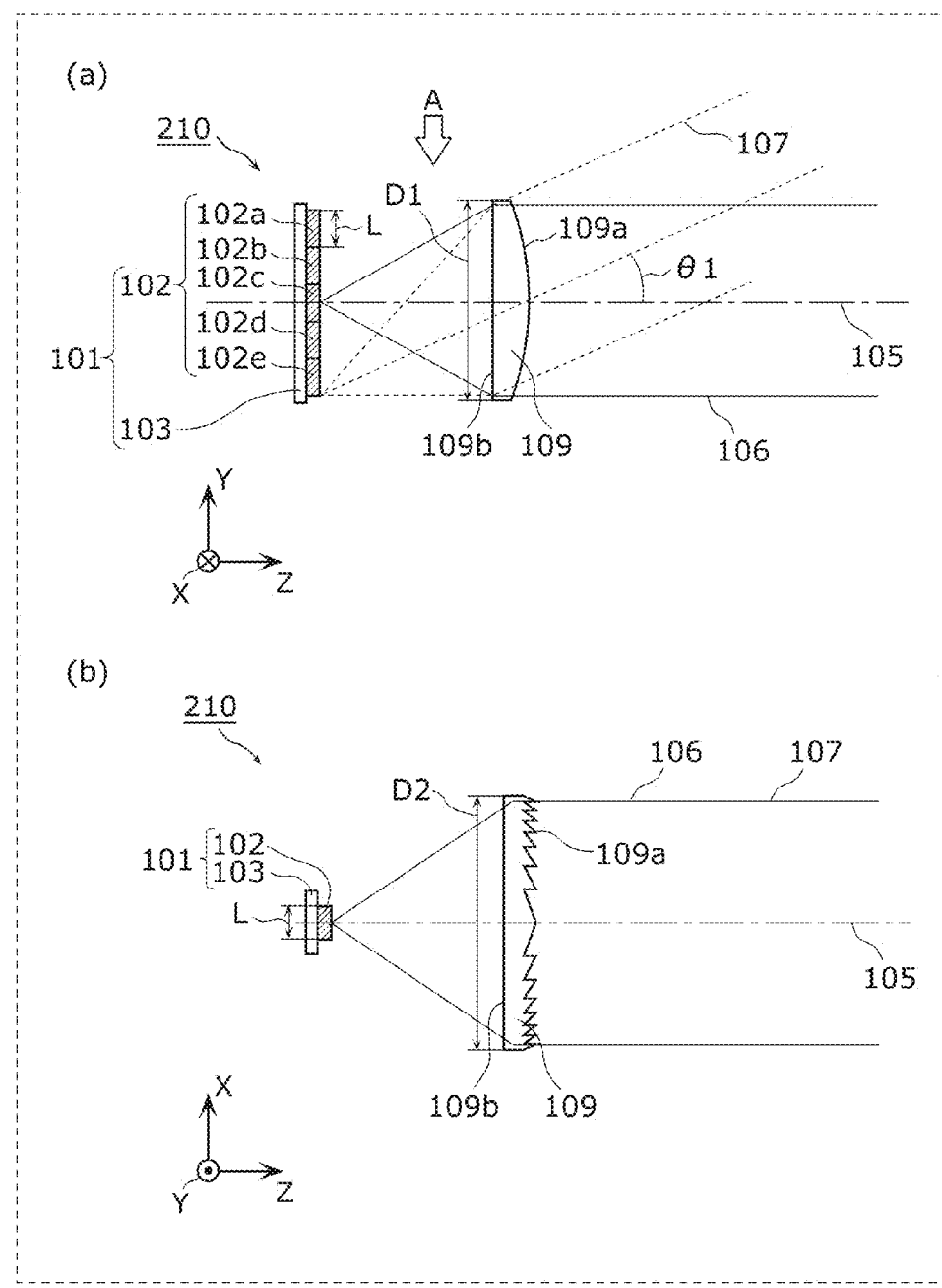
FIG. 4 includes a side view (a) and a top view (b) of a sensor assembly according to Embodiment 1.

FIG. 4 includes a side view (a) and a top view (b) of a sensor assembly according to this embodiment. A sensor assembly 210 illustrated in FIG. 4 is similar to the sensor assembly 100 illustrated in FIG. 1A, but differs from the sensor assembly 100 in including a lens 109 instead of the lens 104 illustrated in FIG. 1A. A right side face 109a of the lens 109 is a continuous face (or can be referred to as a continuous curved face) in the y-axis direction as is the case with the lens 104. In contrast, the right side face 109a of the lens 109 is a Fresnel face in the x-axis direction, and the lens 109 differs from the lens 104 in this point.

Stated differently, a cross-sectional shape of the lens 109 in a plane orthogonal to the second direction includes a Fresnel shape. In contrast, a cross-sectional shape of the lens 109 in a plane orthogonal to the first direction does not include the Fresnel shape.

With this, the following effect is produced especially when light to be detected is in a far infrared region.

As described above, a lens used for the far infrared region has been usually made of germanium or silicon. These materials, however, are not only expensive, but also hard with a high melting point. Thus, the materials are difficult to mold. For this reason, since polishing is used for processing the lens, but there are limitations to shapes into which the lens can be processed, the only shape suitable for mass production is the spherical shape.

The only example of a resin material that transmits light of an infrared region and can be processed by molding is polyethylene (including high density polyethylene), but since absorption occurs inside polyethylene, polyethylene is not used for a purpose of increasing a lens in thickness.

Figure 5:
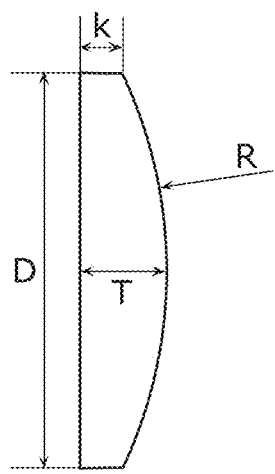
FIG. 5 is a schematic diagram of a shape of a lens.

For instance, as illustrated in FIG. 5, where a thickness of an edge of a lens=0.5 mm, a diameter D of the lens=10 mm, and a radius of curvature of the lens=20 mm, the lens has a thickness T of 1.1 mm. In contrast, in the case where the diameter D of the lens is increased from 10 mm to 12 mm, the lens has a thickness T of 1.4 mm. In the case where the lens is made of polyethylene, where internal transmittance with polyethylene having a thickness of 1 mm is 15.9% and transmittance on the surface of the lens is 95.6%, the lens having the diameter D=10 mm has transmittance of 11%, but the lens having the diameter D=12 mm has transmittance reduced almost by half, that is, 6.7%. In other words, for a spherical lens, increasing a diameter of the lens thickens the lens accordingly, and transmittance is consequently reduced.

In view of this, as illustrated in FIG. 4, the lens 109 is designed to have a Fresnel face with respect to at least the x-axis direction orthogonal to the arrangement direction of the pixel row 102 of the sensor assembly. With the lens having the Fresnel face, it is unlikely that transmittance is reduced even when a lens diameter is increased. For this reason, the lens 109 having a necessary thickness (length) with respect to the y-axis direction can be produced, and thus a bright lens that is inexpensive and further has high transmittance can be configured. In doing so, a sensor assembly that is inexpensive and has higher detection sensitivity can be configured.

Figure 6:
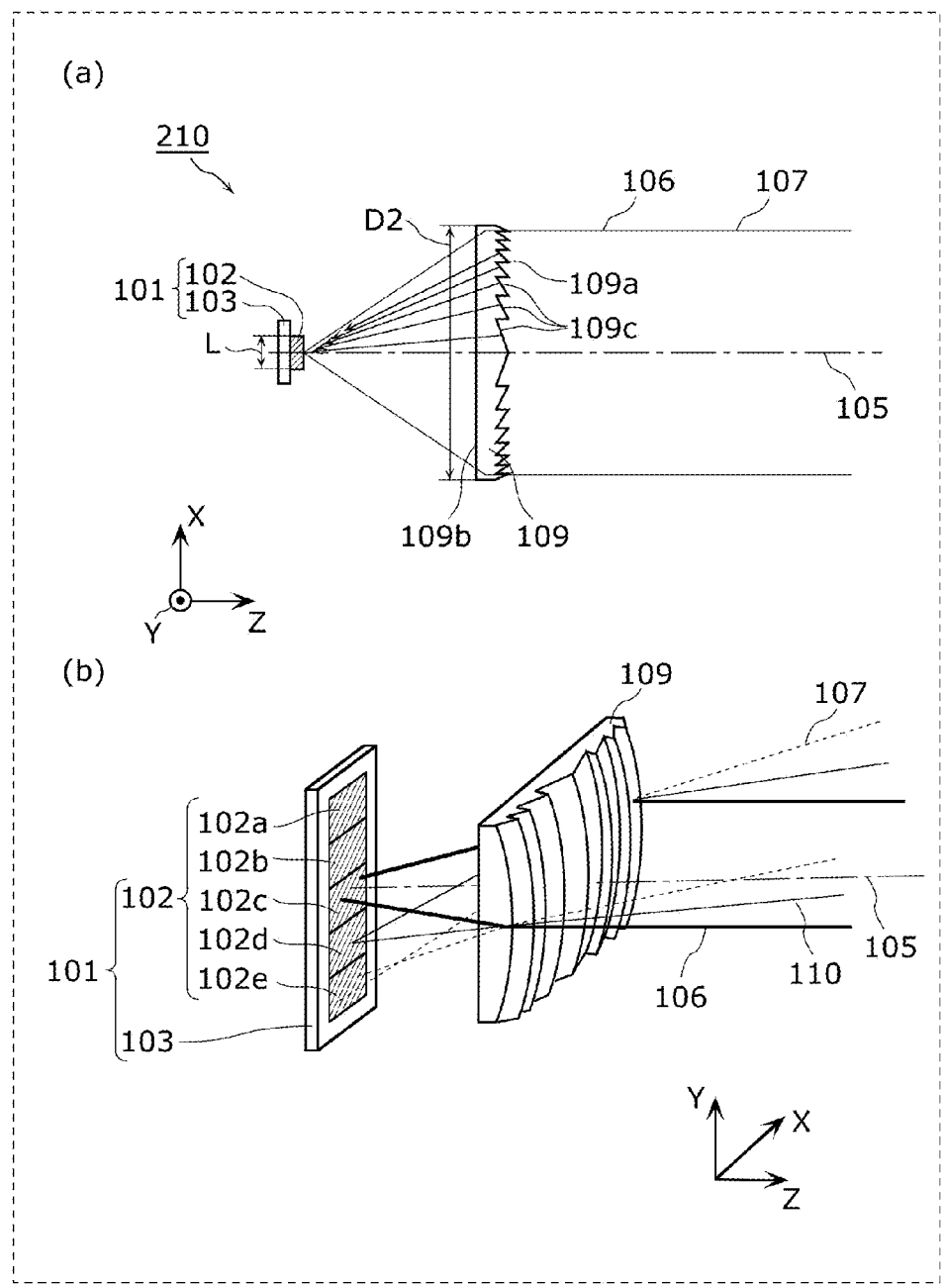
FIG. 6 includes a schematic diagram (a) of a Fresnel shape in an x-axis direction, and a schematic diagram (b) of a spot position on each pixel for oblique incident light, in a sensor assembly according to Embodiment 1.

Moreover, the Fresnel shape of the right side face 109a in the axis direction may be formed by designing a shape that is the same as the spherical (non-spherical) shape in the y-axis direction to be the Fresnel face, or may be formed by designing a shape that is different from the spherical (non-spherical) shape in the y-axis direction to be the Fresnel face as illustrated in (a) of FIG. 6. It is necessary to consider oblique incident light in terms of the shape of the lens 104 or 109 in the y-axis direction since the pixels are in the y-axis direction. Regarding the x-axis direction, however, the pixel row 102 is only on the optical axis 105 in (a) of FIG. 6. Therefore, light may be focused on the optical axis, and it is not necessary to consider the influence of the coma aberration. With this, a tilt of each facet of the Fresnel face of the right side face 109a can be set so that far infrared radiation that has passed through each facet moves toward the pixel row 102 in (a) of FIG. 6, that is, the influence of the spherical aberration is removed. Generally, the shape is a non-spherical shape that is different from the shape in the y-axis direction, but a moldable resin such as polyethylene can be easily processed.

This allows far infrared radiation to be precisely focused on the pixel row 102 even when a width D2 of the lens 109 in the x-axis direction increases, and the width D2 of the lens 109 to increase to the limit without further increasing the thickness. As a result, it is possible to increase an amount of far infrared radiation to be received by each pixel. Therefore, the sensor assembly having the higher detection sensitivity can be configured.

Furthermore, the sensor assembly 210 may be configured as illustrated in (b) of FIG. 6. Far infrared radiations that are focused on the respective pixels 102c, 102d, and 102e through the lens 109 are referred to as the normal incident light 106 and the oblique incident lights 110 and 107, respectively. A shape of the Fresnel face of the lens 109 in the x-axis direction may be determined so that the oblique incident light 110 that is focused on the pixel 102d between the pixel 102c on the optical axis 105 and the pixel 102e at one end of the pixel row 102 is focused exactly on the pixel 102d (focus is adjusted).

When such oblique incident lights exist, because distances from the lens 109 to the pixels are different, the number of positions where focus is adjusted on the pixel row 102 is two or one (on the optical axis). For this reason, focus cannot be adjusted in all positions on the pixels. In view of this, the oblique incident light 107 incident on the pixel 102e is focused before the oblique incident light 107 is incident on the pixel 102e, and the normal incident light 106 incident on the pixel 102c is virtually focused behind the pixel 102c. In this case, it is possible to minimize a total amount of out-of-focus on each of the pixels 102c, 102d, and 102e, thus making it possible to minimize a beam radius in the x-axis direction. Therefore, a sensor assembly having a little variation in detection sensitivity for each pixel can be configured.

It is to be noted that the far infrared radiation is used as the electromagnetic wave incident on the sensor in the above description. When detected temperature is normal temperature, a peak wavelength of infrared radiation emitted from a black body is around 8 to 10 micrometers. Although polyethylene that transmits infrared radiation of 8 to 10 micrometers is described as the example of the lens in the above description, a moldable resin that transmits far infrared radiation can be surely used except polyethylene.

Moreover, although the bolometer or the thermopile having sensitivity in the far infrared region is usually used for the pixels included in the sensor 101, a component capable of detecting far infrared radiation may be used except the bolometer and the thermopile.

Figure 7:
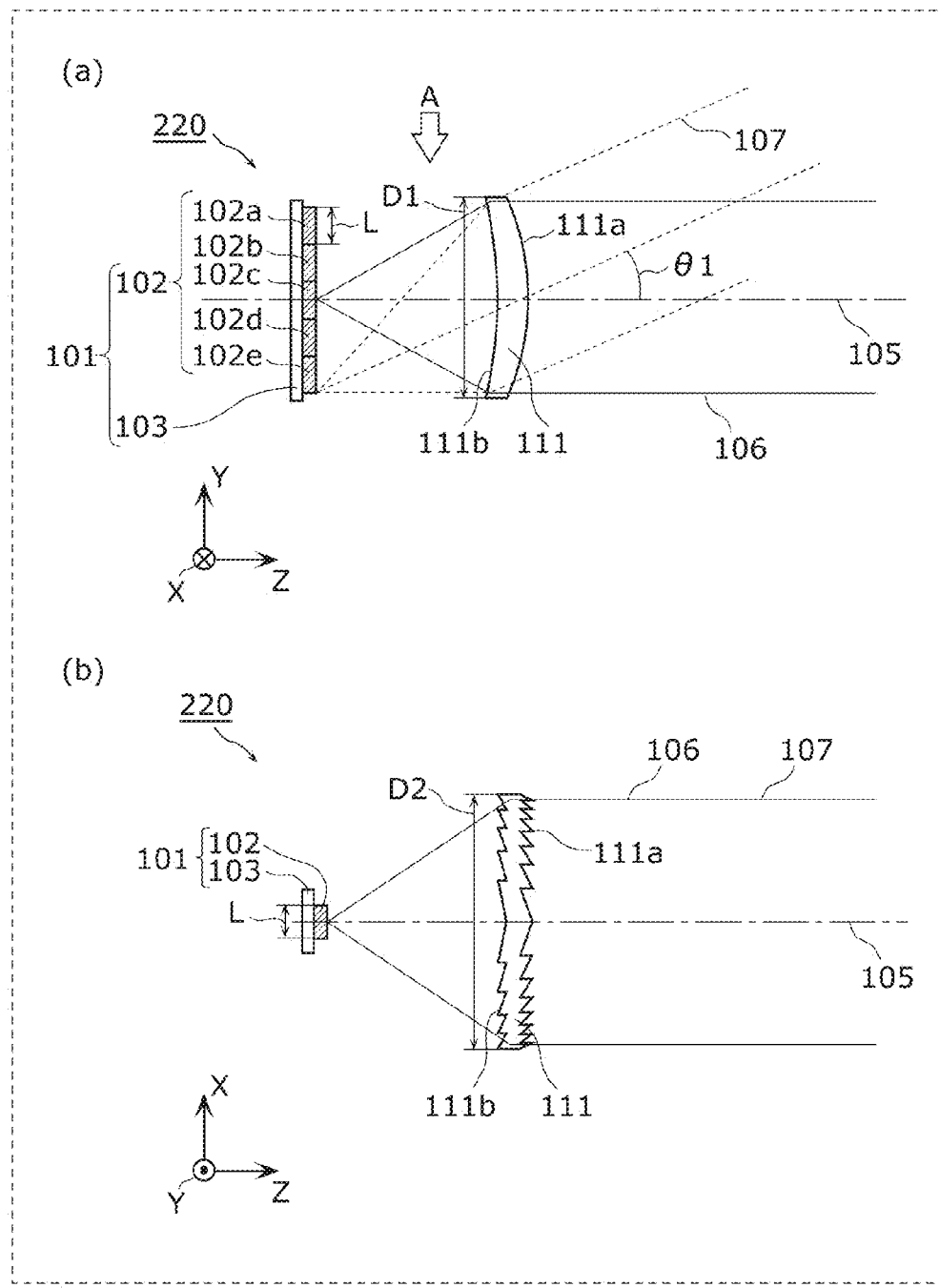
FIG. 7 includes a side view (a) and a top view (b) of a sensor assembly according to Embodiment 1.

FIG. 7 includes a side view (a) and a top view (b) of a sensor assembly according to this embodiment. A sensor assembly 220 illustrated in FIG. 7 is similar to the sensor assembly 210 illustrated in FIG. 4, but differs from the sensor assembly 210 in including a lens 111 instead of the lens 109 illustrated in FIG. 1A. The difference between the lens 111 and the lens 109 is that while a left side face 109b of the lens 109 is a flat face, a left side face 111b of the lens 111 is a curved face. In addition, the lens 111 is a meniscus in the y-axis direction. With this, it is possible to reduce the thickness of the lens 111 along a Y-Z section.

Moreover, since a sagittal plane illustrated in (b) of FIG. 7 includes a Fresnel face, it is possible to further reduce the thickness of the lens 111. With this, it is possible to increase an amount of far infrared radiation incident on each pixel, and thus a sensor assembly having higher detection sensitivity can be configured.

It is to be noted that so far in this embodiment, the shape of each of the lens 104, 109, and 111 in the y-axis direction includes not a discrete face such as the Fresnel face but a continuous face. The Fresnel face may be surely sufficient, but by designing the shape in the y-axis direction to be the continuous face, for instance, it is possible to prevent spot performance from deteriorating due to scattering of light by each facet included in the Fresnel face. This produces an effect of preventing the decline in resolution.

Figure 8:
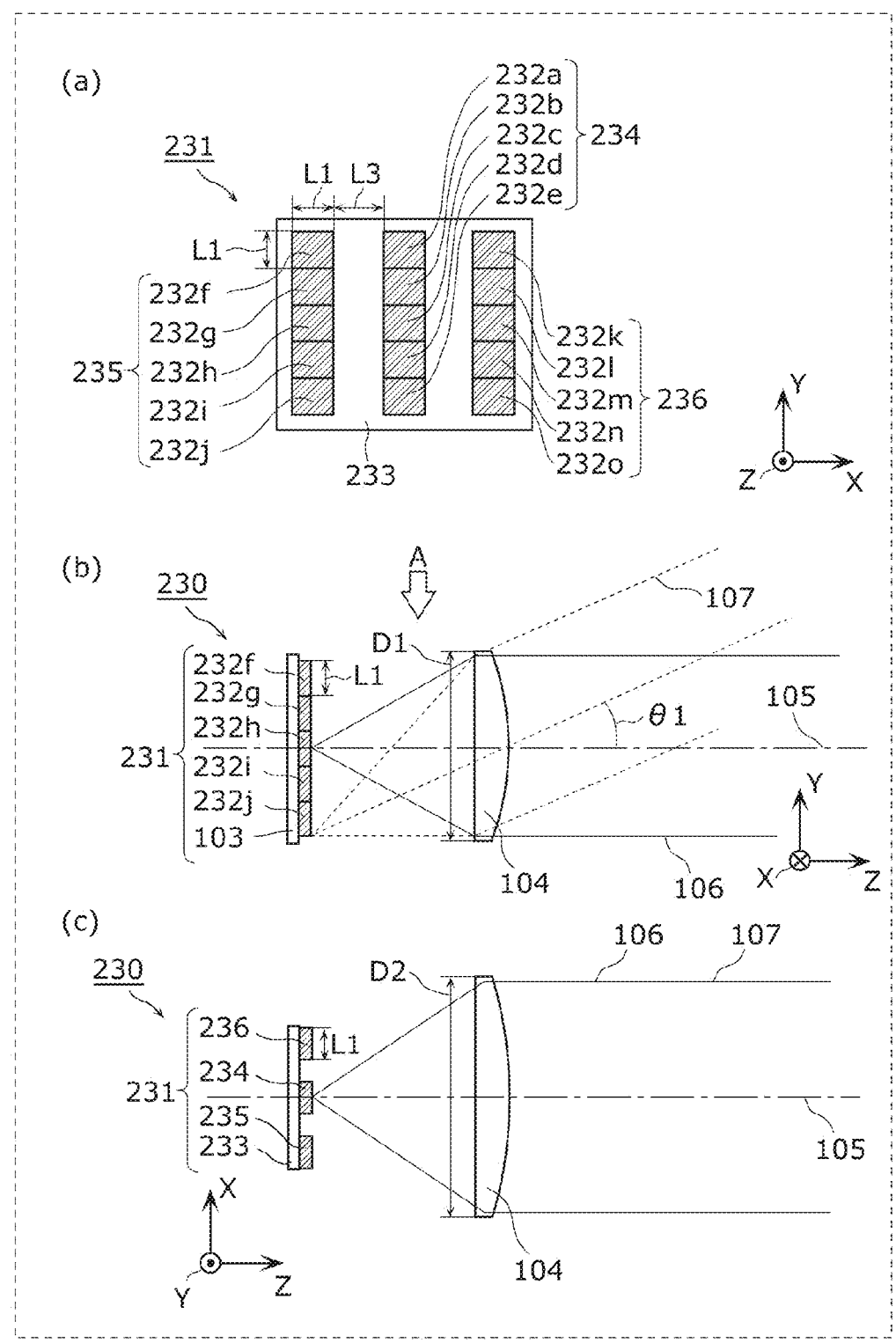
FIG. 8 includes a schematic diagram (a) of a sensor included in a sensor assembly according to Embodiment 1, and a side view (b) and a top view (c) of the sensor assembly.

Although the line sensor having only the one pixel row in the sensor is used above, pixel rows may be arranged as illustrated in FIG. 8.

FIG. 8 includes a schematic diagram (a) of a sensor included in a sensor assembly according to this embodiment, and a side view (b) and a top view (c) of the sensor assembly. The following describes a sensor assembly 230 including a sensor 231 having three pixel rows with reference to FIG. 8.

As illustrated in (a) of FIG. 8, the sensor 231 has three pixel rows 234, 235, and 236.

The pixel row 234 includes pixels 232*a*, 232*b*, 232*c*, 232*d*, and 232*e*.

The pixel row 235 includes pixels 232*f*, 232*g*, 232*h*, 232*i*, and 232*j*.

The pixel row 236 includes pixels 232*k*, 232*l*, 232*m*, 232*n*, and 232*o*.

The pixels are arranged in the y-axis direction in the respective pixel rows, and have a square shape with a height and a width both represented by L1. The pixel rows are arranged parallel to each other with an interval L3 therebetween.

(b) and (c) of FIG. 8 illustrate the sensor assembly 230 including the sensor 231. (b) of FIG. 8 is a side view of the sensor assembly 230, and (c) of FIG. 8 is a top view when viewed from a direction indicated by an arrow A in (a) of FIG. 8. The sensor assembly 230 is similar to the sensor assembly 100 illustrated in FIG. 1A, but differs from the sensor assembly 100 in that instead of the pixel row 102 of the sensor assembly 100, the three pixel rows 234, 235, and 236 are arranged with a distance L3 therebetween in the sensor assembly 230.

Here, even when a spot diameter in the x-axis direction on each pixel is large because a width D2 of the lens 104 in the x-axis direction is larger than a width D1 in the y-axis direction, L3 is determined so that part or whole of an electromagnetic wave to be incident on the pixel row 234 is not incident on the pixel row 235 or 236. Likewise, the distance L3 between the pixel rows is determined so that part or whole of an electromagnetic wave to be incident on the pixel row 235 or 236 is not incident on the pixel row 234. With these, it is possible to increase an amount of far infrared radiation incident on each pixel while maintaining a resolution. This produces an effect of increasing a region that can be detected once by three times while maintaining a resolution and high detection sensitivity.

It is to be noted that although each pixel has the square shape with the side L1 in FIG. 8, the pixel may be a rectangle having a longer side in the x-axis direction, as described above for the sensor 201. With this, even when the spot diameter in the x-axis direction on each pixel increases, an amount of light of an electromagnetic wave to be received increases, and thus a sensor assembly having higher detection sensitivity can be configured.

As described above, the sensor assembly according to this embodiment is capable of increasing an amount of an electromagnetic wave that passes through the imaging optics and is detected by the pixel more than in a case where the imaging optics that has, as a common f-number in the first direction and the second direction, a larger one of the f-numbers of the imaging optics in the first direction and the second direction is used. Therefore, the sensor assembly is capable of increasing the detection sensitivity more than in the above case.

Moreover, even when a material used for the imaging optics has relatively low transmittance for electromagnetic wave, the sensor assembly is capable of maintaining or increasing an amount of an electromagnetic wave transmitted by the imaging optics as a whole. When the material used for the imaging optics has the relatively low transmittance for electromagnetic wave, an amount of an electromagnetic wave that passes through the imaging optics decreases. In contrast, by setting the different f-numbers in the first direction and the second direction as stated above, the amount of the electromagnetic wave that passes through the imaging optics is increased. Thus, by setting the increased amount to be larger than or equal to the decreased amount, it is possible to maintain or increase the amount of the electromagnetic wave transmitted by the imaging optics as a whole.

Consequently, it is unnecessary to use, for the imaging optics, a material that is high-priced and expensive to process such as silicone and germanium, and a material that is low-priced and inexpensive to process can be used for the imaging optics. Therefore, the sensor assembly can be produced inexpensively while maintaining the detection sensitivity.

(Embodiment 2)

A sensor assembly according to this embodiment is described below with reference to FIG. 9.

Figure 9:
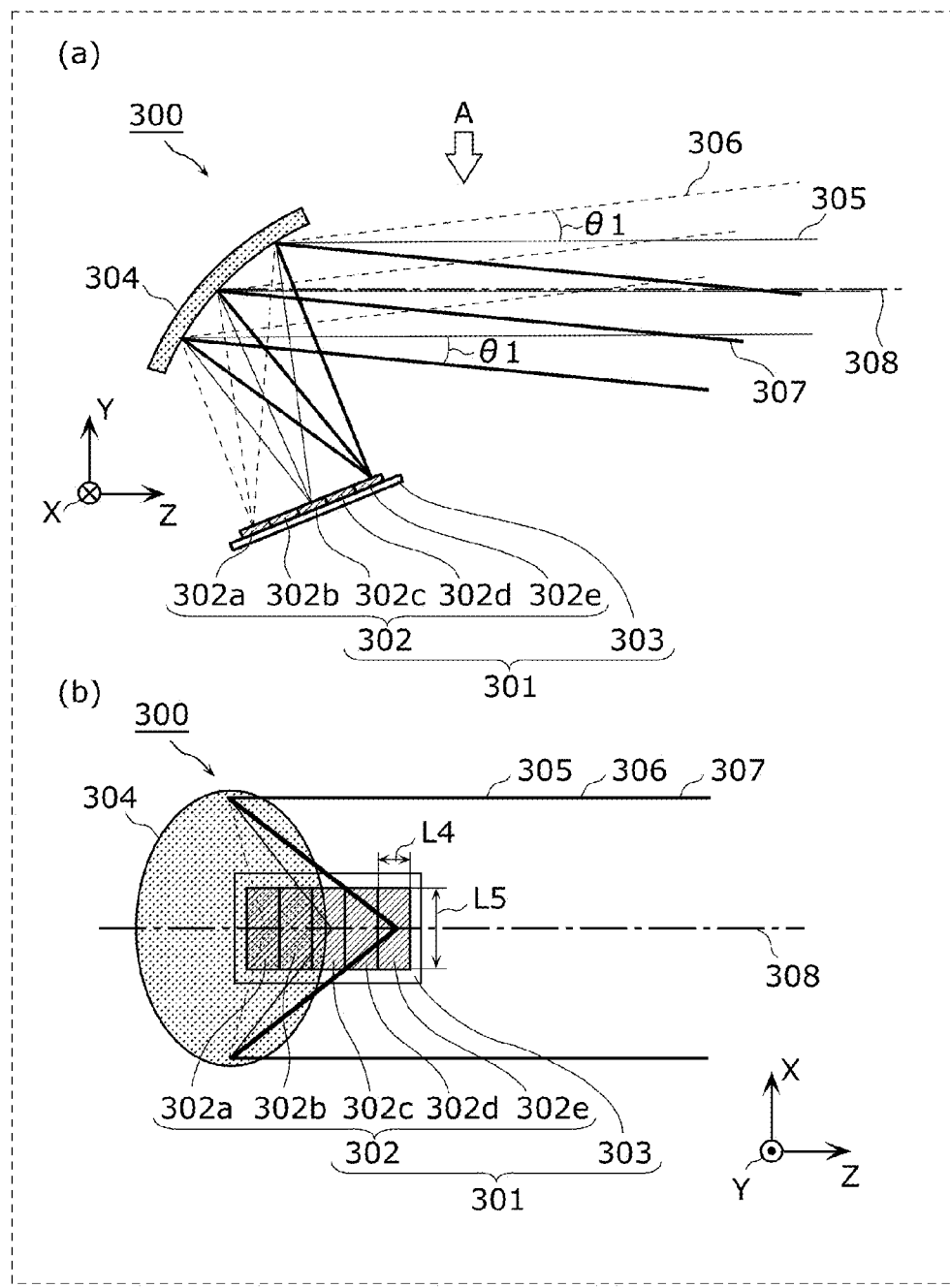
FIG. 9 includes a side view (a) and a top view (b) of a sensor assembly according to Embodiment 2.

FIG. 9 includes a side view (a) and a top view (b) of a sensor assembly 300 according to this embodiment. The sensor assembly 300 is similar to the sensor assembly 200 according to Embodiment 1, but differs from the sensor assembly 200 in including a reflective imaging optics including an off-axis paraboloidal mirror 304 instead of a transmissive imaging optics including the lens 104. Accordingly, a sensor 301 is positioned appropriately.

(a) of FIG. 9 is the side view of the sensor assembly 300, and (b) of FIG. 9 is the top view of the sensor assembly 300 when viewed from a direction indicated by an arrow A in (a) of FIG. 9. Here, the off-axis paraboloidal mirror 304 is illustrated in a semi-transparent manner in (b) of FIG. 9 to facilitate understanding, but the off-axis paraboloidal mirror 304 is actually not transparent. Moreover, as shown by a coordinate axis in each of the figures, in (a) of FIG. 9, an x-axis direction penetrates a plane of paper from back to front, a y-axis direction goes from below to top in the plane of paper, and a z-axis direction goes from left to right in the plane of paper. Similarly, in (b) of FIG. 9, an x-axis direction goes from below to top in a plane of paper, a y-axis direction penetrates the plane of paper from back to front, and a z-axis direction goes from left to right in the plane of paper.

The sensor assembly 300 includes the sensor 301 and the off-axis paraboloidal mirror 304.

The sensor 301 includes a sensor board 303 and a pixel row 302. The pixel row 302 is disposed on the sensor board 303 and includes pixels 302*a*, 302*b*, 302*c*, 302*d*, and 302*e*.

The off-axis paraboloidal mirror 304 forms, in a detector plane on the sensor 301, an image according to an electromagnetic wave. The off-axis paraboloidal mirror 304 corresponds to the imaging optics.

FIG. 9 includes the side view (a) and the top view (b) of the sensor assembly 300 according to this embodiment. First, an operation in a tangential plane by the sensor assembly 300 is described below with reference to (a) of FIG. 9. In (a) of FIG. 9A, a normal incident light 305 is an electromagnetic wave radiated from not shown one point on an object plane and an optical axis 308. The normal incident light 305 is vertically incident on the off-axis paraboloidal mirror 304 of the sensor assembly 300 along the optical axis

308. The normal incident light 305 is reflected off the off-axis paraboloidal mirror 304 and incident on the pixel 302c on the sensor 301.

In this configuration, a focal point of a paraboloid included in the off-axis paraboloidal mirror 304 is on the pixel row 302, and the normal incident light 305 is disposed to be focused on the focal point.

Moreover, an electromagnetic wave that is radiated from not shown one point on the object plane and off the optical axis 308 and is obliquely incident on the off-axis paraboloidal mirror 304 is called an oblique incident light. In (a) of FIG. 9, oblique incident lights 306 and 307 are incident at the largest incident angle θ1, for instance. The oblique incident lights 306 and 307 are focused on the respective pixels 302a and 302e farthest from the pixel 302c, the central pixel on the sensor. As stated above, any electromagnetic wave that is radiated parallel to the y-axis from the object plane and incident on the off-axis paraboloidal mirror 304 at an angle less than the angle θ1 is focused on one of positions in the pixel row 302.

Next, an operation in a sagittal plane by the sensor assembly 300 is described below with reference to (b) of FIG. 9. In this embodiment the pixels 302a, 302b, 302c, 302d, and 302e are arranged counterclockwise with the y-axis direction being a center.

The normal incident light 305 is vertically incident on the off-axis paraboloidal mirror 304 along the optical axis 308 of the sensor assembly 300 in the sagittal plane, like the tangential plane in (a) of FIG. 9. The normal incident light 305 is reflected off the off-axis paraboloidal mirror 304 and focused on the center of the pixel 302c in the x-axis direction.

Moreover, the oblique incident lights 306 and 307 illustrated in (a) of FIG. 9 each are reflected off the off-axis paraboloidal mirror 304 and focused on a corresponding one of neighborhoods of the pixels 302a and 302e in (b) of FIG. 9. With this, the off-axis paraboloidal mirror 304 is capable of forming an image on the pixel row 302, from the electromagnetic wave radiated along the y-axis from the object plane.

The following describes an effect of the sensor assembly 300. When light is incident on the off-axis paraboloidal mirror 304, a sagittal ray of the normal incident light 305 is reflected off within a flat face including an optical axis in the off-axis paraboloidal mirror 304. In contrast, sagittal rays of the oblique incident lights 306 and 307 are reflected off not a flat face but a curved face. Here, the off-axis paraboloidal mirror 304 gives different curvature factors within the sagittal plane to the oblique incident lights 306 and 307. The term "sagittal ray" here is referred to light propagating in the sagittal plane.

Regarding a tangential ray, the normal incident light 305 and both the oblique incident lights 306 and 307 are reflected off within a flat face including the optical axis 308 and the y-axis. Thus, with the same f-number, a spot diameter in the x-axis direction on the pixel row 302 and for the oblique incident lights 306 and 307 is different from a spot diameter in a direction of the pixel row. The term "tangential ray" here is referred to light propagating in the tangential plane.

In view of this, a spot diameter in the x-axis direction may be different from a spot diameter in the y-axis direction. Moreover, an f-number in the x-axis direction may be different from an f-number in the y-axis direction. In particular, by increasing the f-number in the x-axis direction, the spot diameter in the x-axis direction on the pixel row 302 can be made substantially the same as the spot diameter in the y-axis direction.

In contrast, as in this embodiment, when the pixel row is arranged in the direction orthogonal to the x-axis direction, it is necessary to thin (decrease) the spot diameter in the direction of the pixel row (the arrangement direction of the pixels), to prevent the resolution from deteriorating due to the electromagnetic wave being incident on the pixel adjacent to the pixel on which the electromagnetic wave is to be incident. For this reason, the sensor 301 and the off-axis paraboloidal mirror 304 are arranged to decrease the spot diameter in the direction of the pixel row on each pixel.

Moreover, in this embodiment, where a length of each of the pixels 302a, 302b, 302c, 302d, and 302e in the x-axis direction and a length in a direction orthogonal to the x-axis direction are L5 and L4, respectively, L5 is set to be greater than L4. With this, by determining to arrange the sensor 301 and the off-axis paraboloidal mirror 304 to decrease the spot diameter in the direction of the pixel row, even when the spot diameter in the x-axis direction on each pixel increases, each pixel is capable of receiving all the amount of incident light. This makes it possible to increase the amount of the electromagnetic wave incident on each pixel while maintaining the resolution in the direction of the pixel row, simultaneously achieve the high resolution and the high detection sensitivity, and further reduce the variation in the amount of light incident on each pixel.

Furthermore, regarding the f-number of the imaging optics including the off-axis paraboloidal mirror 304, the f-number in the tangential direction may be decreased to the extent that the resolution in the direction of the pixel row does not deteriorate. This makes it possible to increase the amount of the electromagnetic wave incident on each pixel while maintaining the resolution in the direction of the pixel row, and thus it is possible to simultaneously achieve the high resolution and the high detection sensitivity.

Figure 10:
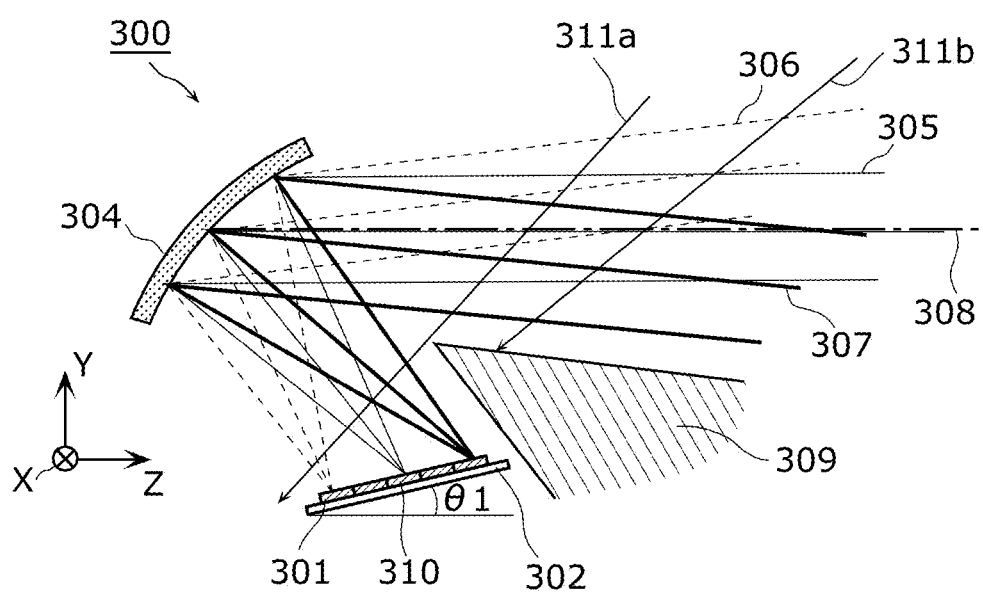
FIG. 10 is a schematic diagram of an arrangement that causes stray light to be received less easily in a sensor assembly according to Embodiment 2.

FIG. 10 is a schematic diagram of an arrangement that causes stray light to be received less easily in a sensor assembly according to this embodiment. As illustrated in FIG. 10, the sensor 301 may be rotated counterclockwise on the x-axis by only a predetermined angle (an angle φ1) so that a focal point 310 of the off-axis paraboloidal mirror 304 is in any one of positions on the pixel row 302. In this state, for example, disposing a shield 309 makes it possible to easily prevent image quality from deteriorating due to stray light.

In the sensor assembly 300, an electromagnetic wave incident on the sensor 301 without being reflected off the off-axis paraboloidal mirror 304 is a stray light, and a stray light 311a or 311b illustrated in FIG. 10 corresponds to such a stray light. When the sensor 301 is tilted counterclockwise around the x-axis as in this embodiment, not only an estimated angle decreases for stray light incident mainly from top right of a plane of paper, but also the shield 309 is capable of shielding the stray light. Accordingly, the sensor assembly 300 is capable of reducing an influence of noise. It is to be noted that this effect is not limited to the line sensor in which the sensor 301 includes the pixel row 302, and even a two-dimensional area sensor is capable of producing the same effect.

Figure 11:
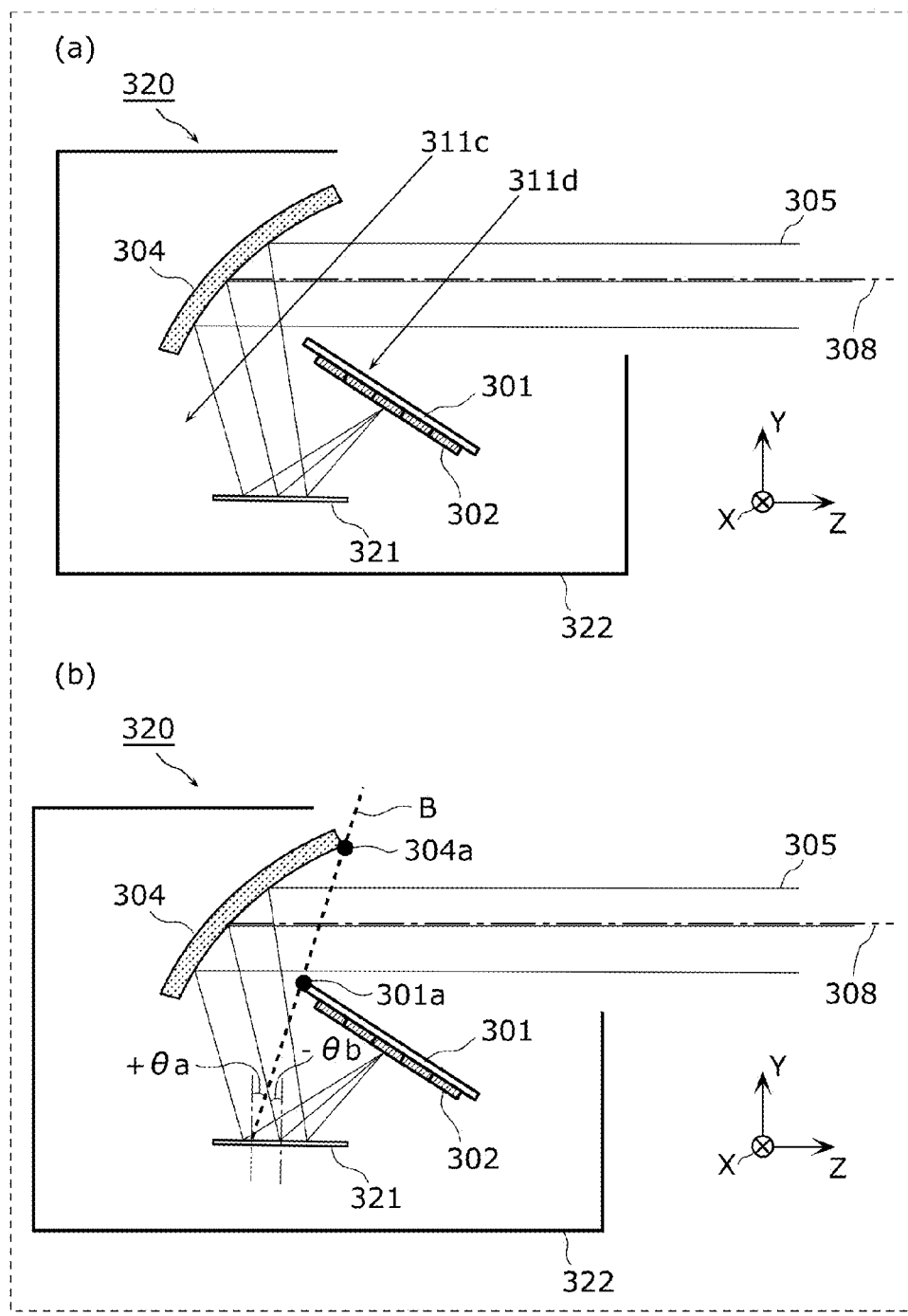
FIG. 11 includes a schematic diagram (a) of an arrangement that causes stray light to be received less easily, and a schematic diagram (b) of an arrangement that further causes stray light to be received less easily, in a sensor assembly according to Embodiment 2.

FIG. 11 includes a schematic diagram (a) of an arrangement that causes stray light to be received less easily, and a schematic diagram (b) of an arrangement that further causes stray light to be received less easily, in a sensor assembly according to this embodiment.

A sensor assembly 320 is similar to the sensor assembly 300, but differs from the sensor assembly 300 in that an electromagnetic wave reflected off the off-axis paraboloidal mirror 304 is reflected off a planar mirror 321 before being received by the pixel row 302 of the sensor 301. Here, although the oblique incident lights 306 and 307 are illustrated in FIG. 9 or FIG. 10, the illustration of the oblique incident lights 306 and 307 is omitted from FIG. 11 to facilitate understanding.

Such a configuration inevitably causes the pixel row 302 of the sensor 301 to face the planar mirror, and thus stray lights 311c and 311d incident mainly from top right of a plane of paper are not directly incident on the pixel row 302. Moreover, a mirror usually has a low radiation factor that is less than or equal to 0.1, and even when the planar mirror 321 or the off-axis paraboloidal mirror 304 is disposed in a position close to the pixel row 302, the planar mirror 321 or the off-axis paraboloidal mirror 304 is less likely to be a noise source. These allow the sensor assembly 320 to further reduce the influence of noise due to stray light. It is to be noted that stray lights from other directions can be easily prevented from being incident by the sensor assembly 320 being covered with, for instance, a housing 322, and thus no more description is given of the stray lights here.

Moreover, the sensor assembly 320 illustrated in (b) of FIG. 11 is similar to the above-described sensor assembly 320 illustrated in (a) of FIG. 11 in structural elements, but differs from the sensor assembly 320 in having conditions described below regarding arrangement. The normal incident light 305 emitted from the off-axis paraboloidal mirror 304 to the planar mirror 321 has its chief ray that is incident at an angle −θb with respect to a normal line of the planar mirror 321. Here, θb is a positive value, and an angle counterclockwise with respect to the normal line of the planar mirror 321 is minus. In (b) of FIG. 11, the normal incident light 305 is incident at the minus angle with respect to the planar mirror 321.

Next, the closest position to the sensor 301 in the off-axis paraboloidal mirror 304 and the closest position to the off-axis paraboloidal mirror 304 in the sensor 301 are denoted by a point 304a and a point 301a, and a straight line passing through the point 304a and the point 301a is referred to as a straight line B. An angle formed by the straight line B and the normal line of the planar mirror 321 at a point where the straight line B and the planar mirror 321 intersect is denoted by +θa. Assuming that θa is a positive value, if a stray light is incident on the planar mirror 321 through the point 304a and the point 301a along the straight line B, the normal incident light 305 and the stray light along the straight line B are reflected off the planar mirror 321 in an opposite direction with respect to the normal line of the planar mirror 321. In other words, the stray light incident along the straight line B is reflected off in a direction opposite to the sensor 301, and thus the stray light is not incident on the pixel row 302 on the sensor 301. As stated above, the sensor assembly 320 is capable of further reducing the influence of the noise due to the stray light.

It is to be noted that also in (b) of FIG. 11, stray lights from other directions can be easily prevented from being incident by the sensor assembly 320 being covered with, for instance, the housing 322, and thus no more description is given of the stray lights here.

It is to be noted that the effect of preventing the stray light described with reference to FIG. 11 is not limited to the line sensor in which the sensor 301 includes the pixel row 302, and even the two-dimensional area sensor is capable of producing the same effect.

As described above, the sensor assembly according to this embodiment can be specifically achieved by using as the imaging optics the mirror having the different f-numbers in the first direction and the second direction. To put it another way, the sensor assembly can be achieved using not the transmissive imaging optics but the reflective imaging optics.

(Embodiment 3)

An example where the sensor assembly described in Embodiment 1 or 2 is used inside an automobile is described in this embodiment.

Figure 12:
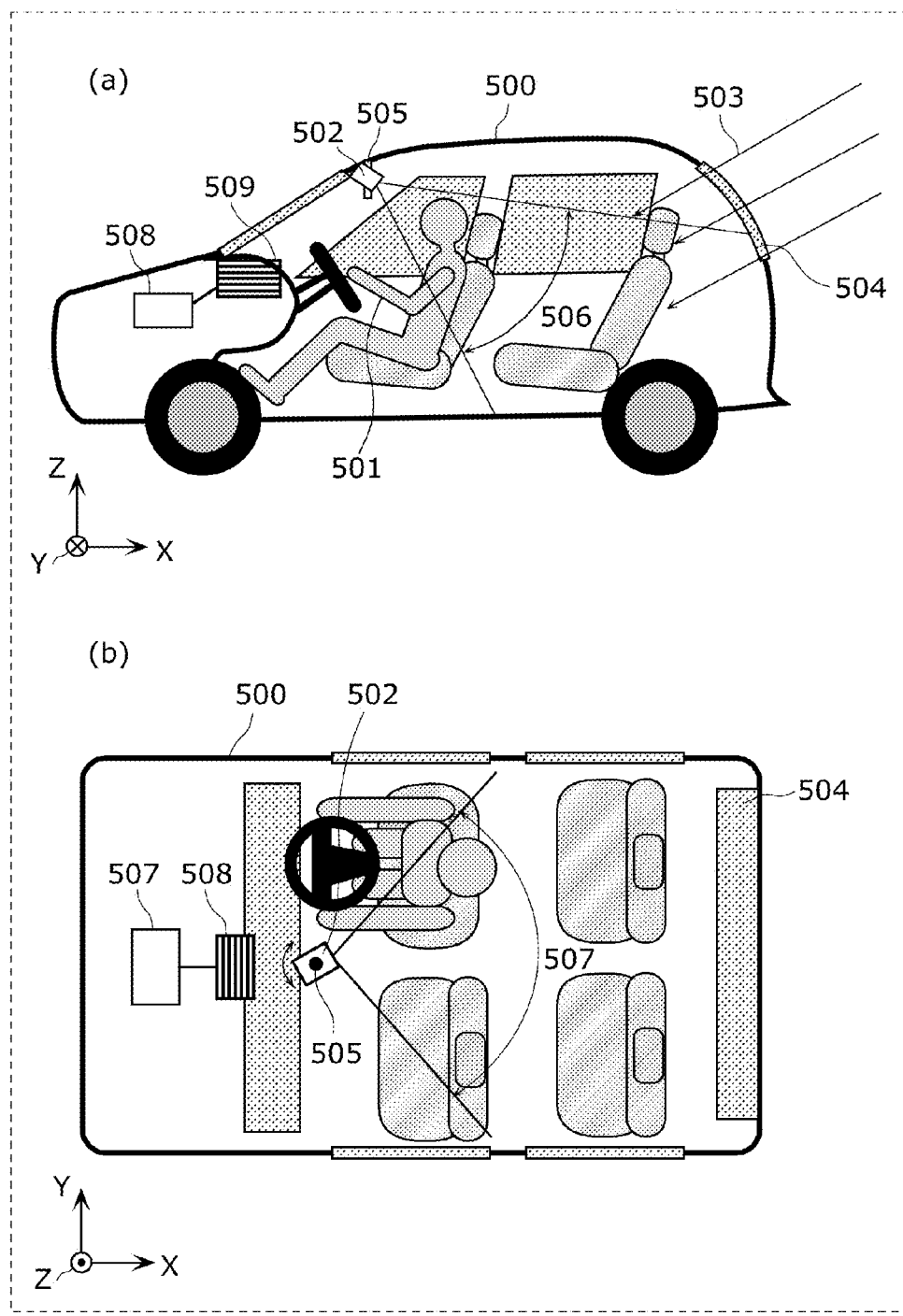
FIG. 12 includes a sectional view (a) and a top view (b) of an automobile when a sensor assembly is mounted on the automobile in Embodiment 3.

FIG. 12 includes a sectional view (a) and a top view (b) of an automobile when a sensor assembly is mounted on the automobile in Embodiment 3. (a) of FIG. 12 is a side view for an example where an sensor assembly 502 is fixed inside of an automobile 500, and (b) of FIG. 12 is a top view of the automobile 500.

The sensor assembly 502 is one of the sensor assemblies described in Embodiment 1 or 2, and is a sensor assembly for a temperature sensor having sensitivity in a far infrared region and capable of measuring a temperature distribution in this embodiment.

A driver 501 drives the automobile 500, and is within a view 506 of the sensor assembly 502. Human thermal sensations (sensations of heat and cold) can be generally estimated to some extent based on a human body surface temperature. For instance, a surface temperature of a forehead having high blood flow and close to a trunk has a little variation with respect to an ambient temperature and is usually kept at near 33° C. In contrast, temperatures of limbs or cheeks, a nose, and ears, though in a face, are likely to be influenced by the ambient temperature, and is correlated to the thermal sensations to some extent. Thus, when a temperature of the limbs or around the face is accurately measured, the human thermal sensations can be estimated based on the measurement result. For example, by controlling an air-conditioning apparatus based on the estimated thermal sensations, comfortable air conditioning inside the automobile 500 can be maintained.

In this embodiment, a case is considered where the sensor assembly 502 detects a temperature distribution of a face of the driver 501. For this purpose, the sensor assembly 502 is rotatably disposed at a rotation center 505 as illustrated in (b) of FIG. 12. The sensor assembly 502 rotates on the rotation center 505 to detect the temperature distribution while scanning a scan range 507 including the face of the driver 501. Moreover, as illustrated in (a) of FIG. 12, the sensor assembly 502 is disposed so that the face of the driver 501 is vertically within the view 506 of the sensor assembly 502. With this, a temperature of the face of the driver 501 while driving can be measured on a real-time basis.

The temperature of the face of the driver 501 measured by the sensor assembly 502 is transmitted to a control unit 508 via a wire that is not shown. The control unit 508 analyzes the measured temperature of the face, estimates the thermal sensations of the driver 501 based mainly on temperatures of cheeks, a nose, ears, and so on, and controls an air conditioner 509 based on the measurement result to adjust, for instance, a temperature, a direction, and a flow speed of air blown by the air conditioner 509. This makes it possible to keep the driver 501 in a comfortable state constantly, and thus it is possible to provide a driving environment with reduced stress.

External light incident from surrounding windows of the automobile 500 is considered. Since a rear window 504 is opposite to the sensor assembly 502, the sensor assembly 502 is likely to be influenced by especially external light incident from the rear window 504.

External light is classified into several types, and one of the types is the sunlight. The sunlight includes far infrared radiation in its spectrum and has a relatively large amount of the far infrared radiation. For this reason, when the sunlight is directly incident on the sensor assembly 502, the sunlight becomes noise, which makes it difficult to measure the temperature distribution of the face of the driver 501 accurately.

Accordingly, in (a) of FIG. 12, the sensor assembly 502 is disposed so that a whole range of the view 506 of the sensor assembly 502 is below a horizontal direction when viewed from the sensor assembly 502. The sun is often on or above the sea horizon or the horizon, and is quite unlikely to be beyond the sea horizon or the horizon. For this reason, by setting the range of the view 506 of the sensor assembly 502 below the horizontal direction when viewed from the sensor assembly 502, the sunlight is almost always prevented from being directly incident on the sensor assembly 502. With this, noise resulting from the far infrared radiation included in the sunlight being incident on the sensor assembly 502 can be prevented from occurring, and the thermal sensations of the driver 501 can be surely estimated.

Figure 13:
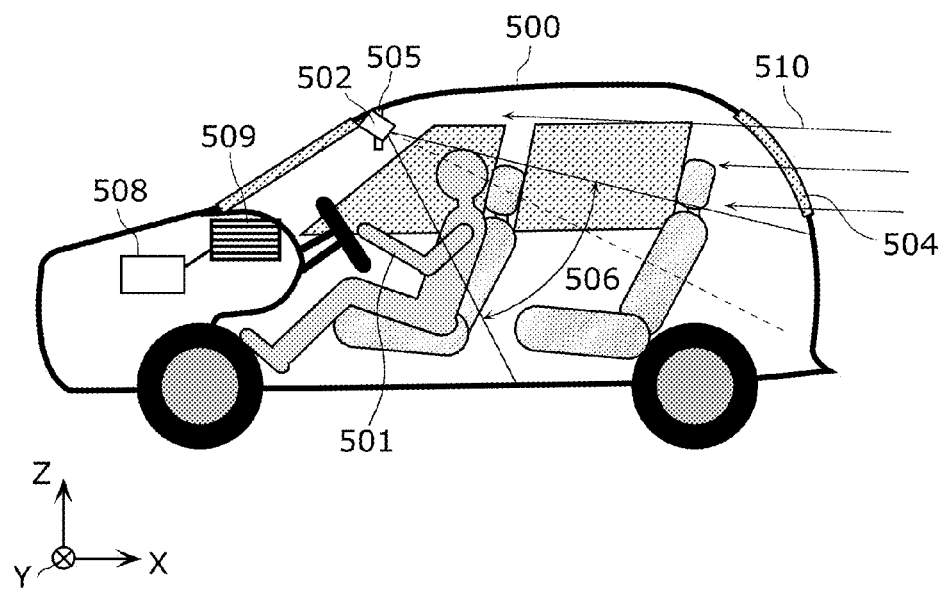
FIG. 13 is a schematic diagram of a structure that prevents an influence of external light when a sensor assembly is mounted on an automobile in Embodiment 3.

Moreover, as illustrated in FIG. 13, the sensor assembly 502 may be disposed so that the rear window 504 is out of the range of the view 506. This can prevent not only the sunlight 503 but also other external light 510 from being incident on the sensor assembly 502.

It is to be noted that the term "other external light" here can refer to far infrared radiation emitted from, for instance, a hood of an automobile behind which is warmed by heat of the engine, or far infrared radiation emitted from, for instance, a person walking behind the automobile 500. Noise resulting from the far infrared radiation included in the external light including the sunlight being incident on the sensor assembly 502 can be prevented from occurring, and the thermal sensations of the driver 501 can be surely estimated.

Furthermore, a filter capable of filtering out far infrared radiation may be inserted into the rear window 504. The external light including the sunlight can be prevented from directly being incident on the sensor assembly 502 by intentionally inserting the filter capable of filtering out the far infrared radiation into the rear window 504. Accordingly, the noise resulting from the far infrared radiation included in the external light including the sunlight being incident on the sensor assembly 502 can be prevented from occurring, and the thermal sensations of the driver 501 can be surely estimated.

It is to be noted that although the driver 501 is the only passenger in the automobile 500 in the above description, the sensor assembly 502 is surely effective even when passengers other than the driver 501 are in the automobile 500. When a passenger other than the driver 501 is in the automobile 500, the control unit 508 may be controlled so that thermal sensations of the passenger are estimated from a temperature distribution of a face of the passenger, and optimal air conditioning for the passenger can be achieved around the passenger. Locally adjusting a temperature, a direction, and a flow of air blown makes it possible to provide optimal local air conditioning for each passenger in the automobile 500.

Moreover, although the thermal sensations of the driver 501 are estimated from the temperature distribution of the face of the driver 501 such as the cheeks, the nose, and the ears in the above description, it goes without saying that hands of the driver 501 may be also measured. Measuring not only the face but also a peripheral body surface temperature makes it possible to estimate the thermal sensations of the driver 501 more accurately, and a better driving environment can be provided.

Furthermore, that the filter capable of filtering out the far infrared radiation is inserted into the rear window 504 is described above, filters capable of filtering out far infrared radiation may be surely inserted not only into the rear window 504 but also into side windows of the automobile 500. This can more surely prevent the external light including the sunlight from being directly incident on the sensor assembly 502. Accordingly, noise resulting from the far infrared radiation included in the sunlight being incident on the sensor assembly 502 can be prevented from occurring, and the thermal sensations of the driver 501 can be surely estimated.

Figure 14:
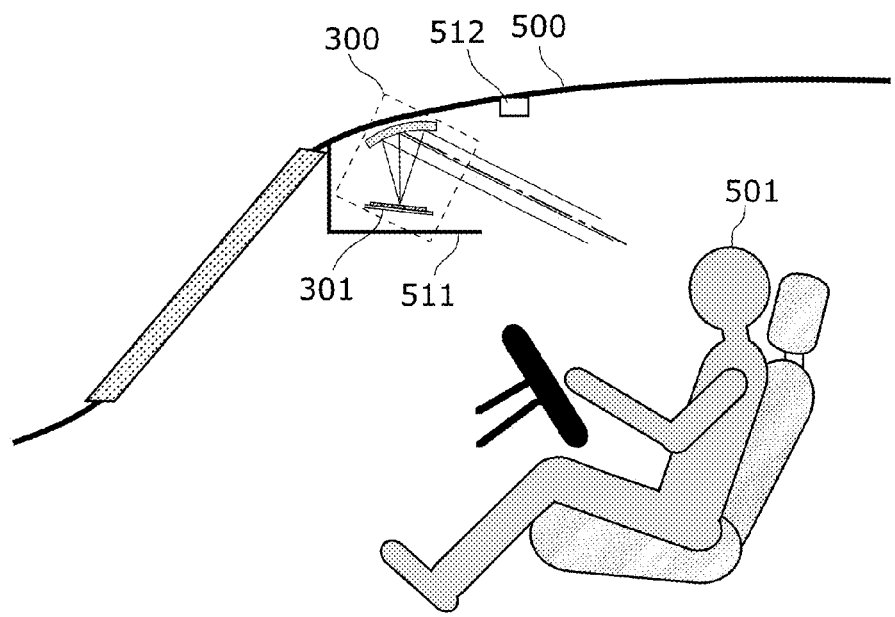
FIG. 14 is a schematic diagram of a structure that prevents an influence of external light when a sensor assembly is mounted on an automobile in Embodiment 3.

Next, a case is considered where external light is incident on the sensor 301 when, as in the sensor assembly 300, a mirror such as the off-axis paraboloidal mirror is used as the imaging optics. Here, as illustrated in FIG. 14, that the sensor assembly 300 described in Embodiment 2 is fixed near a ceiling of the automobile 500 is considered. The external light can be prevented from being directly incident on the sensor 301 from before the automobile 500 by the sensor assembly 300 being covered with a housing 511 except a location where far infrared radiation is allowed to be incident. Moreover, when the sensor 301 is fixed near the ceiling of the automobile 500, all infrared radiation other than infrared radiation incident from above the sensor assembly 300 via the off-axis paraboloidal mirror is from the ceiling of the automobile 500. Thus, by fixing a temperature sensor 512 near the ceiling of the automobile 500, calculating an amount of stray light from a temperature and a radiation factor of the ceiling of the automobile 500, and correcting a temperature distribution obtained from the external light being incident on the sensor 301, the temperature distribution of the driver 501 can be calculated with error effect reduced. It is to be noted that a material having a low radiation factor may be applied to the ceiling of the automobile 500. With this, the external light itself can be reduced, and the error effect can be reduced when the temperature distribution of the face of the driver 501 is calculated.

It is to be noted that although the sensor assembly 300 is described as the example above, the above description generally applies to a case where a mirror is in a sensor assembly, and the present invention is not limited to the configuration of the sensor assembly 300.

It is to be noted that although the sensor assembly 502 including the line sensor is described as the sensor assembly in this embodiment, the example described above produces not only the effect resulting from limiting the sensor included in the sensor assembly 502 to the line sensor, but also the same effect resulting from causing the sensor to be the two-dimensional area sensor.

Figure 15:
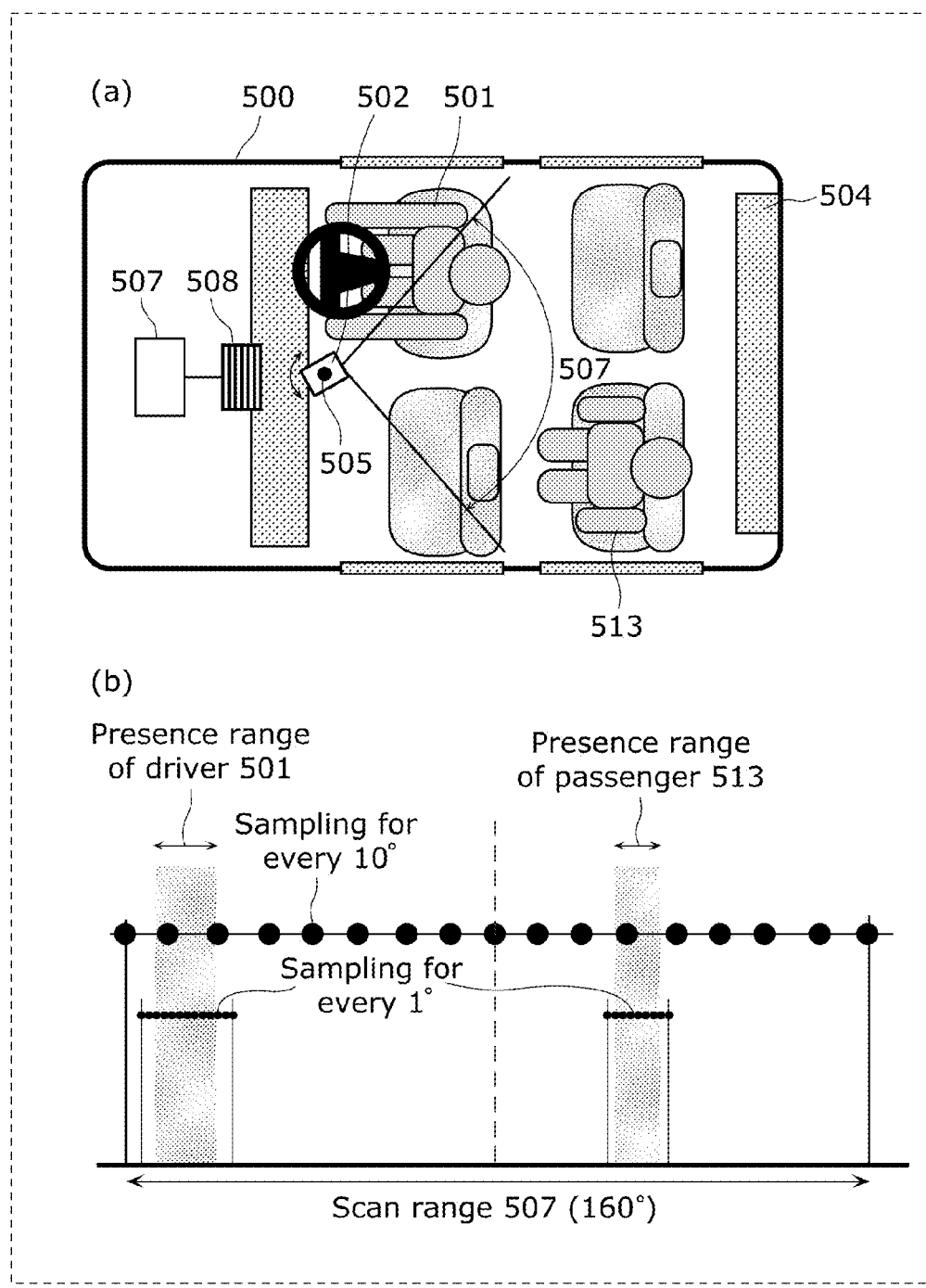
FIG. 15 includes a schematic diagram (a) that illustrates obtainment of a temperature distribution in an automobile by causing a sensor assembly to perform scanning, and a schematic diagram (b) of sampling cycles at the time of scanning, in Embodiment 3.

FIG. 15 includes a schematic diagram (a) that illustrates obtainment of a temperature distribution in an automobile by causing a sensor assembly to perform scanning, and a schematic diagram (b) of sampling cycles at the time of scanning, in this embodiment. The following describes a method for measuring a temperature distribution of a person in the automobile 500 by causing the sensor assembly 502 to perform scanning, with reference to FIG. 15.

As stated above, the sensor assembly 502 detects the temperature distribution of the person in the automobile 500 while scanning a scan range 507, but the scanning of the temperature distribution of the person while distinguishing the nose and the cheeks requires, for instance, scanning with a sampling pitch of an angle of approximately 1°. Here, if it takes one second for the sensor assembly 502 to perform sampling one time, and the sensor assembly 502 scans a scan range of 160°, it takes 160 seconds for the sensor assembly 502 to scan from one end of the scan range to the other end. This is not useful when it is necessary to adjust a room temperature as soon as possible especially right after riding. In view of this, the sensor assembly 502 performs scanning in the following manner in this embodiment.

When the driver 501 and a passenger 513 are in the automobile 500 as illustrated in (a) of FIG. 15, and scanning is started from an end of a scan range on a side where the driver 501 is present, a temperature distribution of the passenger 513 is not easily considered. In response, a case is considered where rough sampling is performed at an angle larger than a necessary sampling angle at the start of riding, and it is determined which position a person is present.

For example, in (b) of FIG. 15, it is assumed that sampling is performed at every 10° at the start of driving such as the time of riding. By performing rough sampling at every 10° to first scan a scan range from end to end, it is possible to determine which position a person is present in 16 seconds (=160/10). Next, for instance, a position in which the driver 501 is detected is determined at every 1° that is necessary accuracy, and subsequently a position of the passenger 513 is determined at every 1° that is necessary accuracy. With this, it is possible to omit unnecessary scanning and estimate thermal sensations of people in the automobile as often as possible, and thus it is possible to keep the driver 501 and the passenger 513 in a comfortable state constantly and provide a driving environment with reduced stress.

It is to be noted that the values of the above-described sampling cycle and scan range are merely examples, and the present invention is not limited to these values.

Moreover, a timing for performing the above-described rough sampling may be anything other than the above-described time of riding (a timing when an engine is turned on). For example, the timing for performing the rough sampling may be a timing when doors of the automobile 500 are opened and closed to allow people to get in and out of the automobile 500, a time when a person is not detected in a position where the person used to be present (e.g., a person moves in the automobile), or an other timing.

Furthermore, for instance, at the timing when the engine is turned on, a presence range of the driver 501 may be first scanned to detect a temperature distribution of the driver. Generally, a driver is highly likely to be in a driver's seat at a timing when an automobile is started. In contrast, a probability that a passenger is in a seat other than the driver's seat at the timing is unknown. For this reason, the presence range of the driver 501 is scanned at the timing when the engine is turned on, thermal sensations of the driver 501 are estimated from the temperature distribution of the driver 501, and control of the air conditioner 509 is started for a surrounding area of the driver 501 and the other seats under the same conditions (a temperature, a flow of air, and so on) based on the thermal sensations of the driver 501.

Next, for example, the scan range 507 is scanned at every 10°, it is determined whether a passenger is present, a position of the passenger is determined when the passenger is present, and a wind direction of the air conditioner 509 is controlled in consideration of ensuring that the passenger feels comfortable in the position. When no passenger is present, the air conditioner 509 is controlled in consideration of only the surrounding area of the driver 501. Moreover, sampling of the determined position of the passenger is performed at every 1°, thermal sensations of the passenger is estimated from a temperature distribution of the passenger, and the air conditioner 509 is controlled. With this, even when a sampling speed is low, it is possible to achieve the air conditioner that provides a comfortable environment in the automobile immediately after riding.

(Embodiment 4)

A sensor assembly 700 according to this embodiment is described below with reference to FIG. 16.

Figure 16:
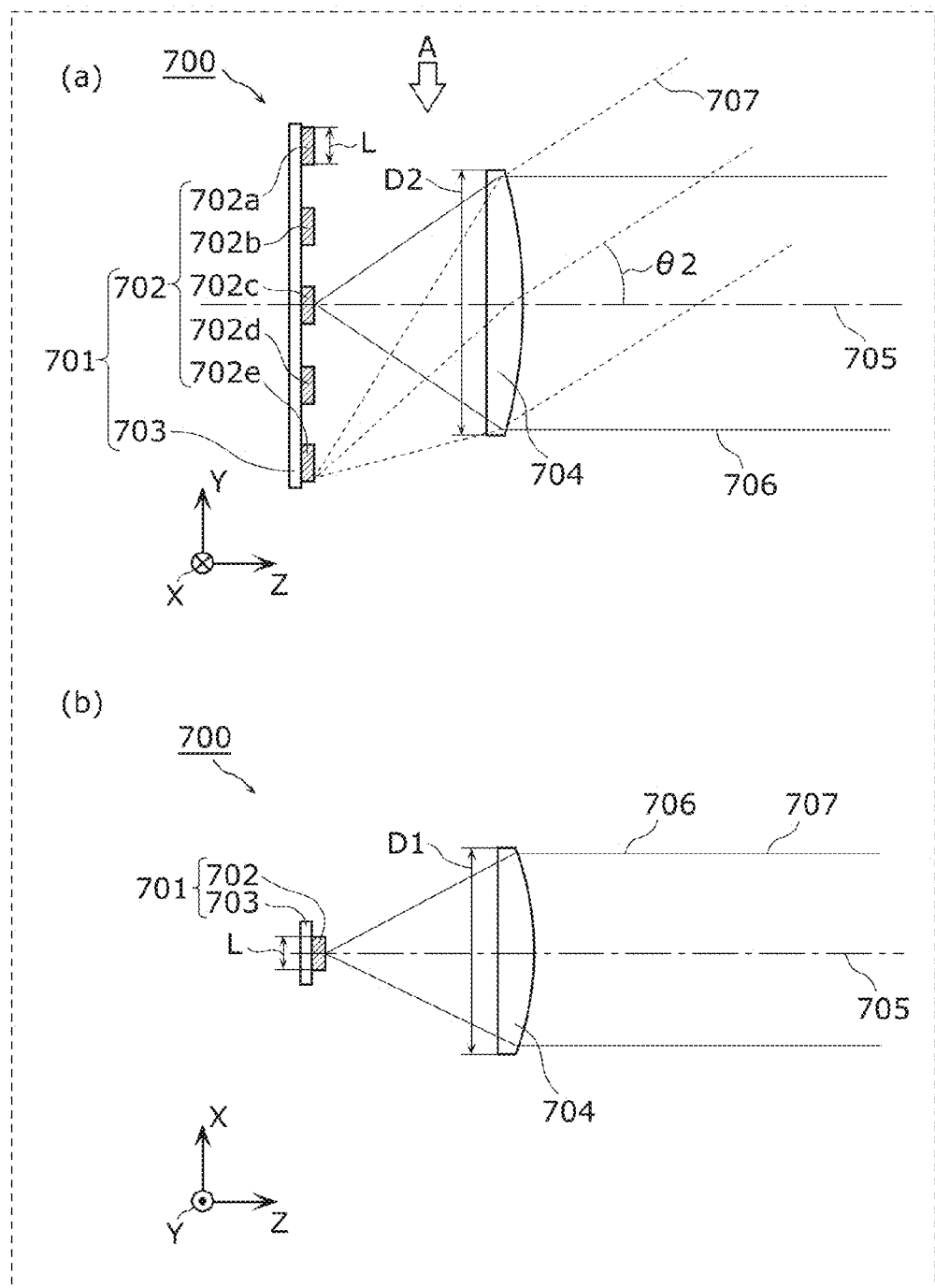
FIG. 16 includes a side view (a) and a top view (b) of a sensor assembly according to Embodiment 4.
Figure 17:
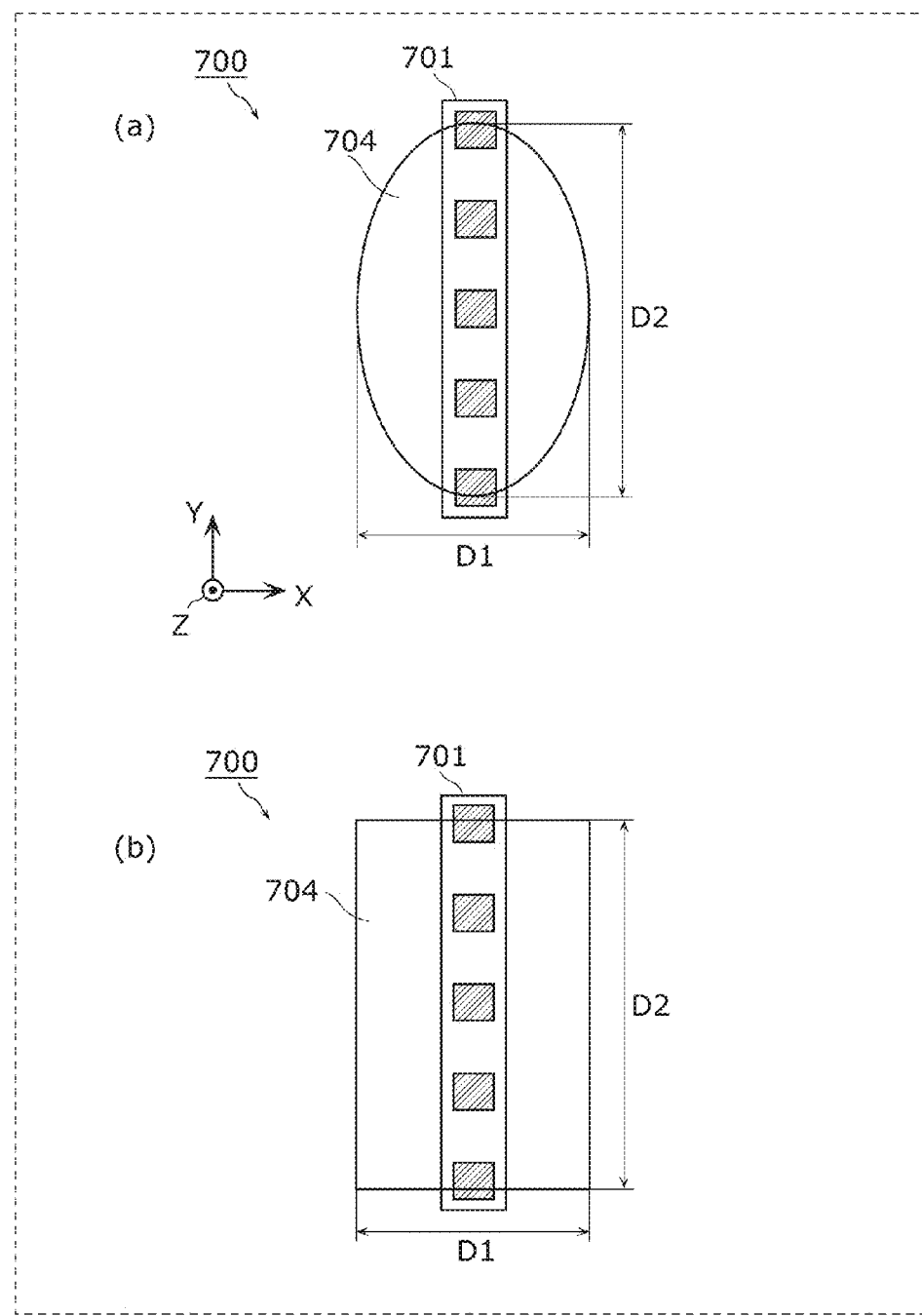
FIG. 17 is a front view of a sensor assembly according to Embodiment 4.

FIG. 16 includes a side view (a) and a top view (b) of the sensor assembly 700 according to this embodiment. FIG. 17 is a front view of a sensor assembly according to this embodiment.

The sensor assembly 700 is similar to the sensor assembly 100 according to Embodiment 1, but differs from the sensor assembly 100 in including a lens 704 and a sensor 701 instead of the lens 104 and the sensor 101, respectively.

(a) of FIG. 16 is the side view of the sensor assembly 700, and (b) of FIG. 16 is the top view of the sensor assembly 700 when viewed from a direction indicated by an arrow A in (a) of FIG. 16.

Like the lens 104, the lens 704 forms, in a detector plane on the sensor 701, an image according to an electromagnetic wave. The lens 704 corresponds to an imaging optics.

As illustrated in (b) of FIG. 16, the lens 704 has a smaller lens diameter D1 in the x-axis direction (the first direction) in which the sensor includes one pixel than a lens diameter D2 in the y-axis direction (the second direction) in which a pixel row 702 is disposed. Moreover, an f-number in the x-axis direction (the first direction) can be larger than an f-number in the y-axis direction (the second direction).

The sensor 701 includes a sensor board 703 and the pixel row 702. The pixel row 702 is disposed on the sensor board 703 and includes pixels 702*a*, 702*b*, 702*c*, 702*d*, and 702*e*. It is to be noted that a plane on a side opposite to the lens 704 in the sensor 701 is also referred to a detector plane. It is to be noted that although an example is described where the sensor 701 includes the five pixels, the number of pixels is not limited to five.

(a) and (b) of FIG. 17 illustrate exemplary shapes of the lens 704. The shape illustrated in (a) of FIG. 17 corresponds to a shape obtained by cutting out, from a spherical lens, an ellipse having a major axis (a diameter in the y-axis direction) D2 and a minor axis (a diameter in the x-axis direction) D1. The shape illustrated in (b) of FIG. 17 corresponds to a shape obtained by cutting out, from the spherical lens, a rectangle having a long side (a side parallel to the y-axis) D2 and a short side (a side parallel to the x-axis) D1. These shapes both have a width in the x-axis direction represented by D1 and a width in the y-axis direction represented by D2. It is to be noted that the above-described shapes are mere examples, and the lens 704 is not limited to the shapes.

When the lens 704 is created by cutting out a shape from the spherical lens, the shape may be any shape having a length in the x-axis direction shorter than a length in the y-axis direction. In other words, on top of the ellipse ((a) of FIG. 17) and the rectangle ((b) of FIG. 17), the shape may be a triangle, a pentagon, or a shape obtained by combining straight lines or curved lines.

The following describes a difference between the lens 104 described in Embodiment 1 and the lens 704.

Figure 18:
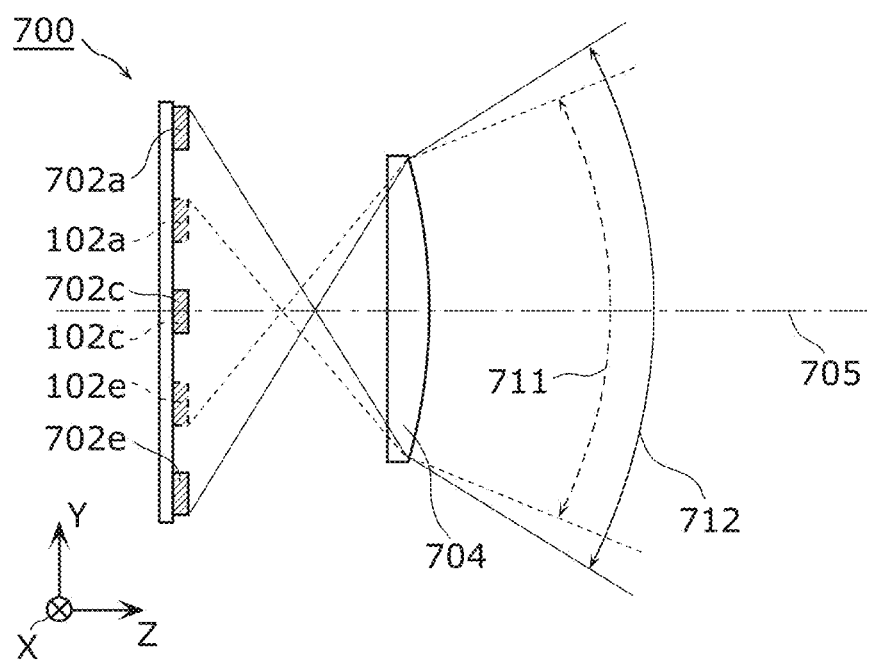
FIG. 18 is a schematic diagram of a measurement range of a sensor assembly according to Embodiment 4.

FIG. 18 is a schematic diagram of a measurement range of a sensor assembly according to this embodiment. Among the pixels included in the sensor 701, the pixels 702*a*, 702*c*, and 702*e* are illustrated in FIG. 18 for explanatory purposes. Moreover, among the pixels included in the sensor 101, the pixels 102*a*, 102*c*, and 102*e* are illustrated. Here, it is illustrated that a position of the pixel 702, a central pixel of the sensor 701, matches a position of the pixel 102*c*, a central pixel of the sensor 101.

Furthermore, FIG. 18 illustrates a range of an electromagnetic wave focused on the sensor 701 or the sensor 101 using the lens 704. Specifically, an electromagnetic wave radiated from a region within a range 712 is focused on the sensor 701 (the pixels 702a to 702e). In contrast, an electromagnetic wave radiated from a region within a range 711 is focused on the sensor 101 (the pixels 102a to 102e). Since the sensor 701 is longer than the sensor 101, the range 712 includes a wider angular range than the range 711. To put it another way, the sensor 701 and the sensor 101 have the same number of the pixels, but the sensor 701 is capable of receiving an electromagnetic wave from the wider angular range.

As described above, the sensor assembly according to this embodiment is capable of receiving light from the wider angular range, and is thus capable of receiving an electromagnetic wave from a wider region.

Although, for instance, the sensor assembly according to one or more aspects of the present invention has been described above based on the embodiments, the present invention is not limited to the embodiments. Those skilled in the art will readily appreciate that various modifications may be made in the embodiments and that other embodiments may be obtained by combining the structural elements in the different embodiments, without departing from the spirit of the present invention. Accordingly, all such modifications and embodiments may be included in the scope of the one or more aspects.

A sensor assembly according to one aspect of the present invention is capable of achieving high sensitivity with an inexpensive configuration, has resistance to stray light, can be used inside an automobile, and is useful.

REFERENCE SIGNS LIST 100, 200, 210, 220, 230, 300, 320, 502, 700 Sensor assembly
101, 201, 231, 301, 701 Sensor
101a Base
102, 202, 234, 235, 236, 302, 702 Pixel row
102a, 102b, 102c, 102d, 102e, 202a, 202b, 202c, 202d, 202e, 232a, 232b, 232c, 232d, 232e, 232f, 232g, 232h, 232i, 232j, 232k, 232l, 232m, 232n, 232o, 302a, 302b, 302c, 302d, 302e, 702a, 702b, 702c, 702d, 702e Pixel
103, 203, 233, 303, 703 Sensor board
104, 109, 111, 704 Lens
105, 308 Optical axis
106, 108, 305 Normal incident light
107, 110, 306, 307 Oblique incident light
109a, 111a Right side face
109b, 111b Left side face
304 Off-axis paraboloidal mirror
309 Shield
310 Focal point
311a, 311b, 311c, 311d Stray light
321 Planar mirror
322, 511 Housing
301a, 304a Point
500 Automobile
501 Driver
503 Sunlight
504 Rear window
505 Rotation center
506 View
507 Scan range
508 Control unit
509 Air conditioner
510 External light
512 Temperature sensor
513 Passenger

The invention claimed is:

1. A sensor assembly comprising:
a line sensor including a plurality of pixels that are aligned in a predetermined direction, the plurality of pixels being for detecting an electromagnetic wave; and
an imaging optics that forms, in a detector plane on the plurality of pixels, an image according to the electromagnetic wave,
wherein the imaging optics has an f-number in a first direction that is smaller than an f-number in a second direction, the first direction being orthogonal to a direction in which the plurality of pixels of the line sensor are aligned in a plane parallel to the detector plane, and the second direction being the direction in which the plurality of pixels of the line sensor are aligned.

2. The sensor assembly according to claim 1,
wherein the imaging optics includes a lens, and
the lens has an f-number in the first direction that is smaller than an f-number of the lens in the second direction.

3. The sensor assembly according to claim 2,
wherein the lens has a width in the first direction that is larger than a width of the lens in the second direction.

4. The sensor assembly according to claim 2,
wherein the lens has different cross-sectional shapes in a plane orthogonal to the first direction and in a plane orthogonal to the second direction.

5. The sensor assembly according to claim 2,
wherein the lens has a cross-sectional shape that includes a Fresnel shape, the cross-sectional shape being in a plane orthogonal to the second direction.

6. The sensor assembly according to claim 2,
wherein the lens has a cross-sectional shape that excludes a Fresnel shape, the cross-sectional shape being in a plane orthogonal to the first direction.

7. The sensor assembly according to claim 2,
wherein the lens is made of polyethylene.

8. The sensor assembly according to claim 1,
wherein the imaging optics includes a mirror, and
the mirror has an f-number in the first direction that is larger than an f-number of the mirror in the second direction.

9. The sensor assembly according to claim 8,
wherein the mirror is an off-axis paraboloidal mirror.

10. The sensor assembly according to claim 9, further comprising a planar mirror.

11. The sensor assembly according to claim 10,
wherein (i) an angle formed by the planar mirror and a straight line connecting one of ends of the off-axis paraboloidal mirror closer to the line sensor and one of ends of the line sensor closer to the off-axis paraboloidal mirror is different from (ii) an angle formed by the planar mirror and an electromagnetic wave incident on the planar mirror from the off-axis paraboloidal mirror.

12. The sensor assembly according to claim 1,
wherein each of the plurality of pixels has a width in the first direction that is larger than a width of each of the plurality of pixels in the second direction.

13. The sensor assembly according to claim 1,
wherein the electromagnetic wave includes far infrared radiation having a wavelength of 8 to 10 micrometers.

14. The sensor assembly according to claim 1, wherein each of the plurality of pixels is an infrared sensor including a thermopile or a bolometer.

* * * * *